US008785845B2

(12) United States Patent
Loboda

(10) Patent No.: US 8,785,845 B2
(45) Date of Patent: Jul. 22, 2014

(54) METHOD AND SYSTEM FOR OPERATING A TIME OF FLIGHT MASS SPECTROMETER DETECTION SYSTEM

(75) Inventor: Alexandre Loboda, Thornhill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 13/017,709

(22) Filed: Jan. 31, 2011

(65) Prior Publication Data

US 2011/0186727 A1    Aug. 4, 2011

Related U.S. Application Data

(60) Provisional application No. 61/300,553, filed on Feb. 2, 2010.

(51) Int. Cl.
    *H01J 49/02*    (2006.01)
    *H01J 49/40*    (2006.01)
    *G01T 1/17*     (2006.01)

(52) U.S. Cl.
    CPC .............. *H01J 49/025* (2013.01); *H01J 49/40* (2013.01); *G01T 1/17* (2013.01)
    USPC .......................................... 250/288; 250/282

(58) Field of Classification Search
    CPC .......... H01J 49/025; H01J 49/40; G05B 1/00; G05B 15/00; G05B 15/02; G01T 1/17; G01T 1/24; G01T 1/247
    USPC .......... 250/281, 282, 286, 287; 700/9, 11, 20, 700/90
    See application file for complete search history.

(56) References Cited

U.S. PATENT DOCUMENTS

| 6,864,479 | B1 | 3/2005 | Davis et al. | |
| 6,870,156 | B2 | 3/2005 | Rather | |
| 6,940,066 | B2 | 9/2005 | Makarov et al. | |
| 7,365,313 | B2 | 4/2008 | Fuhrer et al. | |
| 2002/0175292 | A1* | 11/2002 | Whitehouse et al. | 250/394 |
| 2004/0149900 | A1* | 8/2004 | Makarov et al. | 250/287 |
| 2004/0164239 | A1* | 8/2004 | Franzen | 250/288 |
| 2005/0006577 | A1 | 1/2005 | Fuhrer et al. | |
| 2005/0145788 | A1* | 7/2005 | Davis et al. | 250/288 |
| 2009/0008545 | A1* | 1/2009 | Fuhrer et al. | 250/287 |
| 2011/0001053 | A1* | 1/2011 | Solf | 250/370.08 |
| 2012/0126110 | A1* | 5/2012 | Green et al. | 250/282 |

FOREIGN PATENT DOCUMENTS

WO        2008142418 A2    11/2008
WO    WO 2008142418 A2 *  11/2008

OTHER PUBLICATIONS

International Search Report for PCT/IB2011/000152 dated Aug. 2, 2011.

* cited by examiner

*Primary Examiner* — Nicole Ippolito
*Assistant Examiner* — David E Smith

(57) ABSTRACT

Dual TDC-ADC detection systems for time of flight mass spectrometry are disclosed herein. Detection systems based upon TDC generally provide higher timing resolution as opposed to detection systems based upon ADC. However, ADC generally provides increased dynamic range over TDC. By combining TDC and ADC into a tandem detector, and adjusting performance parameters of the respective converter types, the dynamic range of the dual TDC-ADC detection can be extended beyond what either detector type could have achieved individually. Composite time of flight mass spectra can be generated by aggregating individual mass spectra acquired from multiple time-of-flight extractions, and selecting the number of time-of-flight extractions to ensure overlap between the ADC and TDC dynamic ranges in the dual TDC-ADC detector system.

36 Claims, 11 Drawing Sheets

METHOD AND SYSTEM FOR OPERATING A TIME OF FLIGHT MASS SPECTROMETER DETECTION SYSTEM

RELATED APPLICATIONS

The present application claims priority to a provisional application entitled "Method and System For Operating a Time of Flight Mass Spectrometer Detection System," having a Ser. No. 61/300,553 filed on Feb. 2, 2010, and herein incorporated by reference, in its entirety.

FIELD

The present invention relates generally to systems and methods for operating a time of flight mass spectrometry detection system.

INTRODUCTION

Time of flight mass spectrometry (TOFMS) involves accelerating ions through a field-free drift chamber toward a detector by application of a short, high-intensity electric field of known strength. The electric field is applied to impart kinetic energy to all ions, such that the ion's particle velocity across the drift chamber depends on its m/z ratio. Ions with larger m/z ratios will tend to move at lower velocities, and ions with smaller m/z ratios will tend to move at higher velocities. Each ion's flight time across the field-free drift chamber to reach the detector, which is located a known distance from the ion source, is measurable. The m/z ratios of the ions can then be determined using flight time information and known experimental parameters. Ion flux intensities can also be estimated.

SUMMARY

In accordance with an aspect of embodiments of the present invention, there is provided a method of operating a time of flight mass spectrometer to process ions having a plurality of mass to charge ratios to determine a plurality of ion intensities. The method comprises: a) introducing the ions into the time of flight mass spectrometer in a plurality of time of flight extractions; b) subjecting the ions to an electric field to, for each extraction in the plurality of time of flight extractions, push the ions through a drift chamber to a detector as a sequence of groups of ions for detection by the detector, wherein each group of ions in the sequence of groups of ions comprises ions having a different mass to charge ratio in the plurality of mass to charge ratios; c) detecting ions contacting the detector to generate a sequence of detection signals; d) determining a higher timing resolution data stream by, providing the sequence of detection signals to a higher timing resolution digital converter configured to resolve high peak multiplicities, and for each group of ions detected by the detector, determining at least one associated detection signal in the sequence of detection signals generated by the detector on detection of that group of ions; e) determining a lower timing resolution data stream by providing the sequence of detection signals to a lower timing resolution digital converter; f) processing the higher timing resolution data stream by, for each mass to charge ratio in the plurality of mass to charge ratios, determining a corresponding time and intensity pair representing a flight time and an intensity of ions having that mass to charge ratio, wherein the intensity in the time and intensity pair is determined from a plurality of lower range intensities measured over a plurality of high resolution time intervals; and g) processing the lower timing resolution data stream to determine a plurality of higher range intensity measurements of the sequence of detection signals; wherein the lower timing resolution digital converter is operable to measure intensities above a maximum intensity determinable by the higher timing resolution digital converter; and wherein the higher timing resolution digital converter operates at a higher timing resolution that is higher than a lower timing resolution of the lower timing resolution digital converter.

In accordance with another aspect of embodiments of the present invention, there is provided a method of operating a time of flight mass spectrometer to process ions having a plurality of mass to charge ratios to determine a plurality of ion intensities. The method comprises: a) introducing the ions into the time of flight mass spectrometer; b) subjecting the ions to an electric field to push the ions through a drift chamber to a detector as a sequence of groups of ions for detection by the detector, wherein each group of ions in the sequence of groups of ions comprises ions having a different mass to charge ratio in the plurality of mass to charge ratios; c) detecting ions contacting the detector to generate a sequence of detection signals; d) determining a higher timing resolution data stream by providing the sequence of detection signals to a higher timing resolution digital converter configured to resolve high peak multiplicities, and for each group of ions in the sequence of groups of ions, i) determining at least one associated detection signal in the sequence of detection signals generated by the detector on detection of that group of ions, and ii) determining a corresponding time and intensity pair representing a flight time and an intensity of that group of ions, wherein the intensity in the time and intensity pair is determined from a plurality of lower range intensities measured over a plurality of high resolution time intervals; and e) determining a lower timing resolution data stream by providing the sequence of detection signals to a lower timing resolution digital converter to determine a plurality of higher range intensity measurements of the sequence of detection signals over a plurality of low resolution time intervals; wherein the lower timing resolution digital converter is operable to measure intensities above a maximum intensity determinable by the higher timing resolution digital converter; and wherein the higher timing resolution digital converter operates at a higher timing resolution that is higher than a lower timing resolution of the lower timing resolution digital converter.

In accordance with another aspect of embodiments of the present invention, there is provided a time of flight mass spectrometer system comprising: a drift chamber for receiving ions from an ion source, the ions having a plurality of mass to charge ratios; a detector for generating a sequence of detection signals representing ions contacting the detector; a field generator for generating an electric field to push the ions through the drift chamber for detection by the detector; a higher timing resolution digital converter linked to the detector to receive the sequence of detection signals from the detector, the higher timing resolution digital converter being configured to resolve high peak multiplicities, and operable to generate a higher timing resolution data stream by, for each group of ions detected by the detector, i) determining at least one associated detection signal in the sequence of detection signals generated by the detector on detection of the group of ions, and ii) determining corresponding arrival time data for the at least one associated detection signal, the corresponding arrival time data being determined at high resolution time intervals; a lower timing resolution digital converter linked to the detector to receive the sequence of detection signals from the detector, the lower timing resolution digital converter being operable to generate a lower timing resolution data stream by sampling the sequence of detection signals at low resolution time intervals; and a processor linked to the higher timing resolution digital converter and the lower timing resolution digital converter, the processor being operable to: i) process the higher timing resolution data stream to determine a plurality of time and intensity pairs, each time and intensity pair representing a flight time and intensity of ions having a corresponding different mass to charge ratio in the plurality of mass to charge ratios; and ii) process the lower timing resolution data stream to determine a plurality of higher range intensity measurements of the sequence of detection signals; wherein the lower timing resolution digital converter is operable to measure intensities above a maximum intensity determinable by the higher timing resolution digital converter; and wherein the higher timing resolution digital converter operates at a higher timing resolution that is higher than a lower timing resolution of the lower timing resolution digital converter.

These and other features are set forth and described herein.

BRIEF DESCRIPTION OF THE DRAWINGS

A detailed description of various embodiments is provided herein below with reference to the following drawings.

Figure 1:
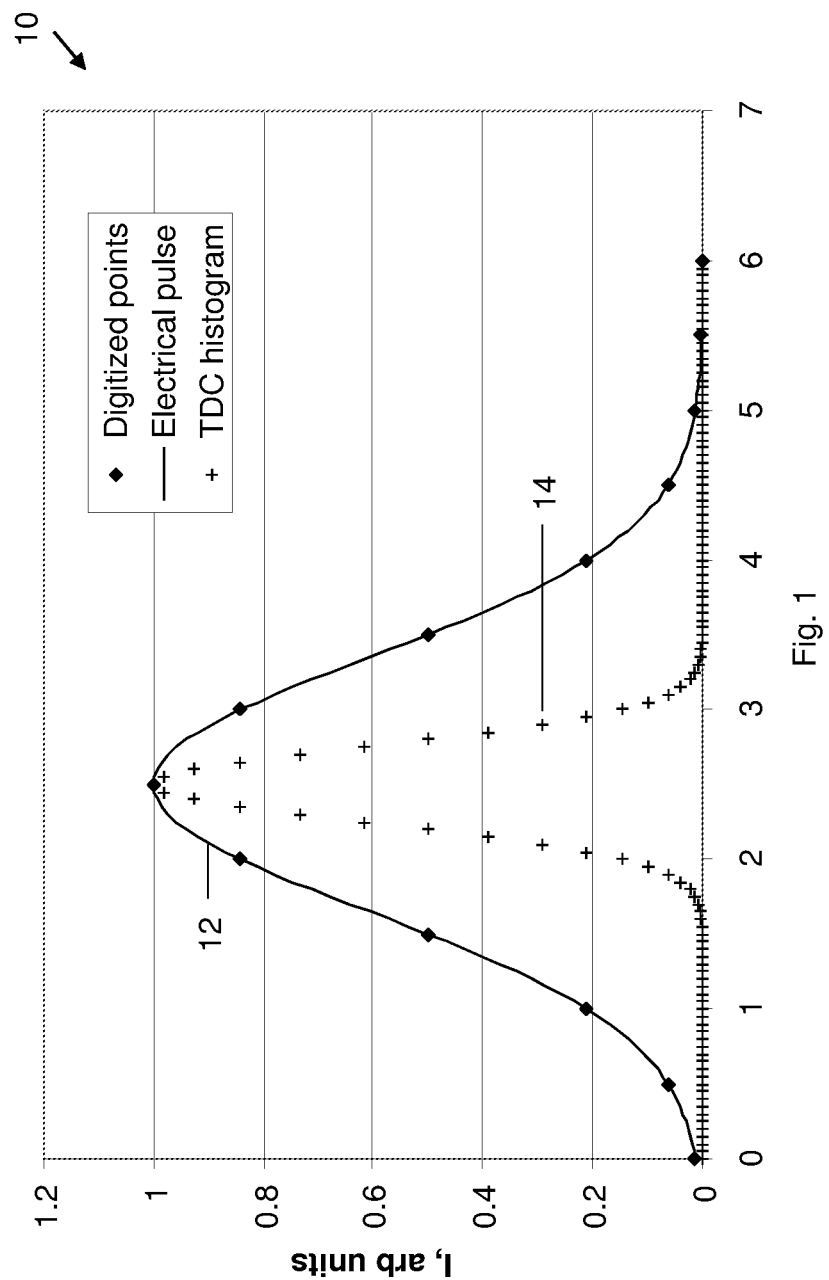
FIG. 1, in a graph, illustrates the time-wise width of an electrical pulse or detection signal resulting from detecting a single ion, and an arrival time distribution for the same ion.

The skilled person in the art will understand that the drawings, described below, are for illustration purposes only, and are not intended to limit the scope of the applicant's teachings in any way.

DESCRIPTION OF VARIOUS EMBODIMENTS

In a time of flight mass spectrometer configuration, a detector can be used to detect ion fluxes. Different detector types may be used depending on the particular time of flight application. The detector types include magnetic electron multipliers, discrete dynode electron multipliers, and micro-channel plate (MCP) electron multipliers. For example, an MCP-type detector comprises a slab, which can be made from a highly resistive material, into which is formed a regular array of tiny recesses (micro-channels) leading from one face of the slab to another. The micro-channels can be disposed generally parallel to one another and at a slight angle relative to the face of the micro-channel plate. Each micro-channel can be a continuous-dynode type electron multiplier maintained at a detector bias voltage.

Ions contacting the side of the micro-channels (the likelihood of which is increased by the slight angle at which they are disposed) can begin an electron cascade in that micro-channel reaction aided by the bias voltage. The electron cascades can propagate through the micro-channels, amplifying the strength of the original ion detection signal by several orders of magnitude, potentially, depending on the amplitude of the bias voltage and the geometry (e.g. length) of the micro-channels. The electron cascades exiting the micro-channels form a total ion current, in the shape of a transient pulse, which is detectable by a suitable electronic component, in its simplest form a metal anode. The micro-channels may be inoperable to detect another ion event until the electron cascade from the previous ion event has had sufficient time to clear. However, for each detectable ion event, the MCP detector will generate a corresponding transient pulse, which together over a sequence of detectable ion events can form a sequence of detection signals to be transmitted for downstream processing. The sequence of detection signals can have dimensions in both time (corresponding to a sequence of ions contacting the detector) and space (corresponding to multiple parallel detector plates).

One or more digital converters can be coupled to the detector for processing the sequence of detection signals for TOFMS. Analog to digital converters (ADC) and time to digital converters (TDC) are two types of digital converters that may be coupled to the ion detector. An ADC operates by digitizing the detection signals at regular time intervals to obtain time and intensity information. For example, the timing of the transient pulse provides a measure of the arrival time of the ions at the detector. The output level of the digitized signal can then provide a measure of current flow during the transient indicative of ion flux intensity. It should be appreciated that extracting intensity information from the output quantization level may depend upon the input signal gain, as well as other operating parameters, of the ADC.

In contrast, a TDC does not ordinarily sense the amplitudes of the transient pulses in the detection signals directly, though two or more TDC operating in parallel may potentially be configured to do so. Instead the TDC in normal operation will simply detect the presence of a transient pulse and record its arrival time. Thus, the TDC will output either a digital "0" (corresponding to a null event) or a digital "1" (corresponding to an ion event) for each time interval of an internal clock signal. If the TDC registers a digital "1", the arrival time of the corresponding transient pulse is recorded and outputted. It is easy to see that the data flow generated by a TDC will usually be significantly lower than the data flow generated by an ADC, since the former only produces an output when a transient pulse is sensed, while the latter outputs a continuous data flow, e.g. a digitized version of the ADC input signal. Often a discriminator is used to trigger the TDC to provide more accurate timing, and to ensure that only transient pulses above a predetermined noise threshold are detected by the TDC as ion events at the detector. A TDC may be favored over an ADC for slow TOF applications with low ion fluxes, or where computing resources are scarce, in part because of its reduced data throughput. However, as will be described below, certain techniques exist to reduce ADC data throughput, though it remains generally larger as compared with TDC.

In addition to data throughput rates, timing resolution and dynamic range are two performance indicators of digital converters for TOF applications. Timing resolution refers to the smallest interval of time between ion peak multiplicities that the digital converter can sense, which is related to the digital converter clock rate. Dynamic range refers to the range of ion intensities, specified by a lower intensity limit and an upper intensity limit, which the digital converter can simultaneously detect. Often these performance indicators will be traded off against each other, depending on the particular TOF application. As a general rule, ADC will provide higher upper intensity limits of measurable ion fluxes than TDC, but TDC will provide superior timing resolution to ADC. For example, according to present technologies, a 50 ps timing resolution, or even a 25 ps timing resolution, would not be uncommon for TDC. On the other hand, the timing resolution of ADC would more typically be an order of magnitude or so larger, for example approximately 500 ps. But in terms of measurable ion fluxes, it would not be uncommon to achieve 2 or 3 orders of magnitude higher using ADC. Moreover, as ADC technologies continue to advance, their timing resolution would be expected to improve as well. But achieving very high timing resolution using ADC presently tends to be quite expensive.

As described above, ion detectors such as MCP type detectors can operate by generating electrical pulses to represent ion events (i.e. the arrival of an ion or group of ions) at the detector. In some cases, the width of the generated electrical pulse will exceed the arrival time distribution for a group of ions of the same kind, i.e. ions having the same m/z ratio. In other words, when a group of ions of a certain m/z ratio is introduced into the drift chamber of the time of flight instrument, the flight times of the respective ions forming the group may not be exactly identical. Consequently, the ions will arrive at the detector distributed within a finite time window. But due in part to practical limitations of the detector, the electrical pulse generated to indicate arrival of the ion group may be wider than the arrival distribution of that ion group. This condition is illustrated in the graph 10 depicted in FIG. 1, which plots time (in nanoseconds) on the x-axis against electric current (in arbitrary units) on the y-axis. It can be seen in FIG. 1 that the width of electrical pulse 12 in a representative detection signal is approximately 2 ns. Pulse width is measured, for example, using full width at half maximum (FWHM). On the other hand, the arrival time distribution 14 for a group of ions of that m/z ratio, depicted in FIG. 1 as a TDC histogram, is approximately 0.6 ns. Clearly the electrical pulse 12 is wider than the arrival time distribution 14.

Accordingly, TDC can be selected over ADC in TOF applications to provide superior timing resolution. Sole use of TDC to record time of flight spectra may however force some dynamic range to be sacrificed, relative to what is possible using a reasonably priced ADC alone, in exchange for the superior timing resolution. Dynamic range limitations of TDC at higher ion intensities can become a significant factor, for example, in some practical TOF applications where the number of available time of flight extractions is limited. As described above, an individual TDC typically only outputs either a digital "1" (corresponding to a detected ion event) or a digital "0" (corresponding to a null event) at each time interval. As a result, the dynamic range provided by TDC tends to be limited by the chosen detector topology, in particular the number of parallel detector plates in the setup. Since each TDC generally only detects a single ion event, increasing the number of independent TDC channels connected to corresponding detector plates can extend the upper limit of the TDC dynamic range. Assuming approximately equal ion flux on all detector plates, the number of detectable ions will increase roughly in proportion to the number of parallel detector plates (each coupled to a separate TDC). Statistical correction algorithms can also be applied to compensate for ion saturation in the one or more TDC, as explained in more detail below, but doing so only extends the dynamic range of TDC by so much. As an example of the dynamic range that is possible with TDC, assuming the TOF mass spectrometer is operated with a 10 kHz time of flight extraction rate, and that individual time of flight spectra can be generated at a rate of between about 10 to 100 spectra/s, it is possible to generate composite mass spectra having between about 100 to 1000 extractions/spectra, with a corresponding dynamic range of between about 100 to 1000. By way of comparison, assuming the same operating parameters, ADC would yield a dynamic range having an upper intensity limit that is about 2 orders of magnitude higher.

Dual TDC-ADC Detection

According to aspects of embodiments of the present invention, TDC and ADC can be employed in tandem within a time of flight mass spectrometer system for extracting time and intensity information from the detection signals generated by the detector. A higher timing resolution data stream generated by a higher timing resolution digital converter (comprising one or more TDC, for example) can be used for detection of low intensity ions, or in regions of the time of flight spectra where ion intensity falls within the dynamic range of the TDC. For higher ion intensities, a lower timing resolution digital converter (comprising one or more ADC, for example) can be used to provide a lower timing resolution data stream containing intensity and peak shape measurements for high abundance ion peaks, and in regions of the time of flight spectra where ion intensity is too high for TDC to measure without being driven into saturation. The higher timing resolution of the higher timing resolution digital converter can be anywhere from two to five or more times the lower timing resolution of the lower timing resolution digital converter. It should be appreciated, moreover, that even where an ADC is used to provide intensity information, simultaneous use of TDC to enhance timing resolution would still be possible in these cases.

When a multi-channel detector and corresponding plurality of TDCs are used for expanded dynamic range, the detection signals provided to the ADC can be derived as a sum, or possibly a weighted sum, taken over all of the detector channels. Alternatively, each individual channel from the multi-channel detector can be provided to a different input channel of a multi-channel ADC, or perhaps multiple separate ADCs. Cost considerations may however favor providing a summed detection signal to a single ADC, since the per-channel cost of ADC will often be much higher than the per-channel cost of TDC. Thus, a multi-channel TDC utilized in combination with single channel ADC may tend to provide a more economical solution. Of course, multi-channel TDC combined with multi-channel ADC can also work, albeit possibly at greater expense. Single-channel TDC could also be used in conjunction with single-channel ADC.

Strategies for combining the higher timing resolution data stream from the one or more TDCs, on the one hand, and the lower timing resolution data stream from the ADC, on the other hand, may depend on the data of interest. For example, at least two different types of data may be of interest to the system user. One type of data is a peak list, comprising a table of ion m/z ratios and corresponding intensities generated from an individual or composite time of flight spectrum. Another type of data is what is typically called extracted ion current/chromatogram (XIC), which comprises an ion intensity integrated over a predefined m/z range. A typical assumption in XIC is that ion intensity will vary slowly relative to time of flight extraction (pulsing) rate, and thus will remain somewhat constant over multiple, consecutive time of flight extractions. Selected ion monitoring (SIC) is an alternative term used to describe XIC.

Performance Parameters of a Dual TDC-ADC Detection System for TOF

The theoretical performance of a dual TDC/ADC detection system for use with TOFMS may depend on at least the following parameters and other technical considerations.

Time to Digital Converters

One performance parameter of TDC is the number of parallel TDC channels, corresponding to the number of detector channels. Providing a multi-channel detector and coupling each such channel to a separate TDC, in theory, assuming approximately equal ion flux across all the detector channels, can greatly extend the dynamic range of TDC. Since each individual TDC can only detect a single ion event, dividing the detector into an array of parallel detectors allows for additional ion events to be detected and figured into the intensity calculation. Thus, in the discussion that follows, it is assumed that each channel of the multi-channel detector receives on average approximately the same ion flux, i.e. a uniform ion flux distribution over all detector plates.

The dynamic range of TDC will approach its limit when the TDC begins to saturate. If multiple parallel TDCs are configured, dynamic range will approach its limit when each TDC receiving approximately the same ion flux begins independently to saturate. Saturation of TDC describes a state in which the TDC no longer can reliably detect additional ion events. To some extent, saturation effects in the TDC detection channel can be compensated using a saturation correction algorithm, such as the one presented below. In general, saturation correction involves calculating an estimate of how many ions actually contacted the detector based on, among other parameters, the number of time of flight extractions and the number of null events (digital "0"s) recorded by the TDC. A low number of recorded null events is evidence that the TDC is saturated or at least nearing saturation. In other words, a minimum number of null events may need to be recorded in order to provide an accurate estimate. Thus, a low number of null events is evidence of saturation, and may produce a distorted estimate. The minimum number of null events for an accurate estimate can be prescribed by incorporating a tolerance parameter into the calculation.

As an example, one formula for estimating the number of measured ions near the saturation limit is given by:

$$N_i = N_e \cdot \ln\left(\frac{N_e}{N_z}\right), \qquad (1)$$

where $N_i$ is the estimated number of incoming ions within a specified time window, $N_e$ is the number of time of flight extractions, and $N_z$ is the number of recorded null events within the specified time window. Again it is noted that Eq. 1 may only accurately estimate $N_i$ for $N_z$ satisfying an acceptable tolerance parameter. Equation 1 applies to a single TDC but, it should be appreciated, can be modified for a multiple parallel TDC. Equation 1 can also be calculated separately for each ion group of a different m/z ratio. For multiple TOF extractions $N_e$, the TDC will sense either a null event (digital "0") or an ion event (digital "1") when ions of that m/z reach the detector depending on whether or not the group of ions was detected. Over all time of flight extractions $N_e$, the TDC will thus measure $N_z$ null events, and correspondingly $N_e$-$N_z$ ion events within the time window, since the TDC will detect either a zero or a one. However it may be that more than $N_e$-$N_z$ ions contacted the detector, even though only $N_e$-$N_z$ ion events were detected. Theoretically, some ions events could involve multiple ions, while other ion events may have occurred during the detector dead time. Equation 1 estimates the number of ions to contact the detector. Thus, it should be appreciated that Eq. 1 may calculate $N_i$>$N_e$, even though the TDC can only detect a single ion per extraction for each group of ions of a different m/z ratio in the extraction. As a numerical example, assuming 1000 time of flight extractions and 100 recorded zero events, Eq.1 estimates $N_i$ to be approximately 2300, which is over 2 times as large as $N_e$. Clearly the dynamic range of the TDC can depend on both the number of time of flight extractions $N_e$ and the applied saturation correction algorithm. Of course, it should be appreciated that Eq. 1 is not the only possible saturation correction algorithm and that other algorithms may be implemented as well.

Analog to Digital Converters

According to aspects of embodiments of the present invention, at least the following parameters can affect the theoretical performance, including dynamic range, of an ADC.

A first parameter affecting theoretical performance is the number of bins in the ADC. A typical ADC operates by quantizing analog signals using an array of input levels (or "bins") to generate a representative digitized signal. The ADC may be characterized by its input signal range, input bias, number of input levels, and applied quantization step size. These parameters are generally interrelated—the number of input levels multiplied by the quantization step size defines the size of the input signal range, with the input bias related to the lowest quantizable signal. It should also be appreciated that quantization step size need not be fixed, and that some ADCs make use of a progressive quantization step size to extend input signal range.

The number of bins in the ADC is relatable to the bit precision of the ADC. As the representative digitized signal will be binary encoded, $N=2^b$ estimates the number of bins, N, required to provide b-bit precision in the digitized signal. For example, a typical 8-bit ADC used for many high-speed applications will have 256 or so bins. It should be appreciated, however, use of all 256 bins may be practically difficult, in that some of the ADC bins may be allocated to store information regarding baseline variation.

Another parameter affecting theoretical performance is the uncorrelated noise of one ADC measurement. Practical analog signals are not free from noise. If sufficient noise is present on the channel, the ADC may quantize its analog input signal to the wrong quantization level, resulting in noise errors in the output signal. In the case of ion detection signals, the noise errors will introduce inaccuracy into the intensity measurements provided by the ADC. The uncorrelated noise parameter accounts for noise that is always present on the ADC input channel, in other words noise that does not correlate to any point in time or event occurring on the channel, i.e. it is random channel noise. A typical value for this uncorrelated noise is 1 bin for a single extraction on a single channel. Thus, due to the presence of uncorrelated noise, the ADC may quantize the detection signal 1 bin higher or lower than it would have in the absence of uncorrelated noise. Theoretically, the uncorrelated noise grows as a square root of the number of extractions when ion transients are summed together. This would apply in the case of two transients in a single extraction summed across parallel channels, but also in the case of two transients from two separate extractions summed together.

Correlated noise constitutes a third parameter affecting theoretical performance of the ADC. As distinguished from uncorrelated noise, correlated noise refers to noise on the ADC input channel whose magnitude does vary in time or in response to certain time of flight events, such as ion detection events. For example, background digital operations in the ADC may appear as correlated noise. Correlated noise tends generally to be much smaller than uncorrelated noise for one recorded transient, for example a whole order of magnitude smaller. However, correlated noise does grow proportionally to the number of summed transients, and therefore can begin to affect data accuracy if enough ion transients are summed together. In principle, it is possible to measure the amount of correlated noise in an ADC measurement so that it can be nullified. But as many different factors can contribute to the amount of correlated noise on the ADC (e.g. baseline drift, thermal variation of ADC response, etc.), it may not be practically feasible, or even possible, to completely eliminate correlated noise. Some level of correlated noise may endure.

A fourth parameter affecting theoretical ADC performance is averaged ion response. Defined in the present context in terms of ADC bins, this parameter is used to convert the output quantization level of the ADC into corresponding ion intensities. In other words, averaged ion response can be used to specify the average amplitude of a recorded transient pulse, generated upon arrival of a single ion of a single m/z ratio at the detector, in terms of ADC bins. It provides a base unit of measurement, in a sense, with which to determine the number of ions in a transient from the recorded amplitude of the transient pulse. It should be appreciated that the averaged ion response can depend on, and be controlled by, different system parameters. In one case, changing the input gain of the ADC (signal amplification/attenuation) will affect the average ion response in the ADC, but without having a corresponding effect on the TDC channel. In this case, in accordance with aspects of the present invention, an attenuator can be provided with the ADC to apply an attenuation factor before digitization in order to increase the measurable input signal range of the ADC. Other system parameters affecting averaged ion response in the ADC may also affect average ion response in the TDC. For example, adjusting the detector bias voltage can affect the magnitude of the resultant detection signal at its source. Since the sequence of detection signals is provided to both the TDC and the ADC, it should be appreciated how the averaged ion response will in this case be affected in both digital converters.

Yet another parameter affecting theoretical ADC performance is minimum signal to noise (S/N) ratio for ion detection. This parameter provides a criterion by which to determine a minimum acceptable data quality for the ADC. Data having a minimum S/N ratio can be found acceptable, and other data having less than the minimum S/N ratio can be discarded as unreliable. For example, a minimum number of ions required for accurate detection by the ADC can be defined using a combination of the averaged ion response value (discussed above), and a noise estimate generated as a quadratic mean or route mean square of uncorrelated and correlated noise estimates (also discussed above).

According to some aspects of embodiments of the invention, the ADC data may undergo only the simplest processing step, namely summing of transients over a plurality of detector channels, in which case the ADC will be operating in an integrating transient recording mode. Of course, other data processing is becoming available on newer ADCs, assisted by inclusion of on-board or dedicated external processing modules.

Controlling ADC and TDC Dynamic Range

In systems and methods employing dual TDC-ADC detection schemes, in accordance with aspects of embodiments of the present invention, the above-discussed theoretical performance parameters can be selected so as to control the respective dynamic ranges of the TDC and ADC. According to some embodiments, the dynamic ranges of the TDC and ADC are controllable so that at least some or all of the following conditions are satisfied. First, the dynamic range of the ADC is optimized for higher ion fluxes caused by many ions arriving simultaneously at the detector, as opposed to single ion events. Second, the dynamic range of the TDC is optimized for lower ion fluxes and single ion events at the detector. Third, the dynamic ranges of the ADC and TDC overlap at a certain range of ion fluxes, such that the dynamic range of the combined detection system is extended beyond what each detector type could have measured individually. When overlap is achieved, then it should be possible to reliably measure any incoming ion intensity within a certain range using at least one of the ADC and TDC.

In such a dual TDC-ADC configuration, the ADC may not be operable to detect single ion events with an acceptable S/N noise ratio. Likewise the TDC may not be operable to record large ion fluxes without entering into saturation. Accordingly, the ADC can be operable to detect an upper range of ion intensities that will generally lie above the lower range of intensities that the TDC will be operable to detect. However, an upper limit of the lower intensity range (of the TDC) may lie above a lower limit of the upper intensity range (of the ADC), thereby causing the dynamic ranges of the two digital converters to overlap. Clearly the combined dynamic range achieved by dual TDC-ADC detection will exceed what each detector type could have achieved individually. As mentioned, at least some or all of the above-discussed performance parameters can be selected in order to optimize the combined dynamic range. As will be discussed in greater detail below, the number of time of flight extractions provides an additional, selectable parameter for controlling dynamic range.

Figure 2:
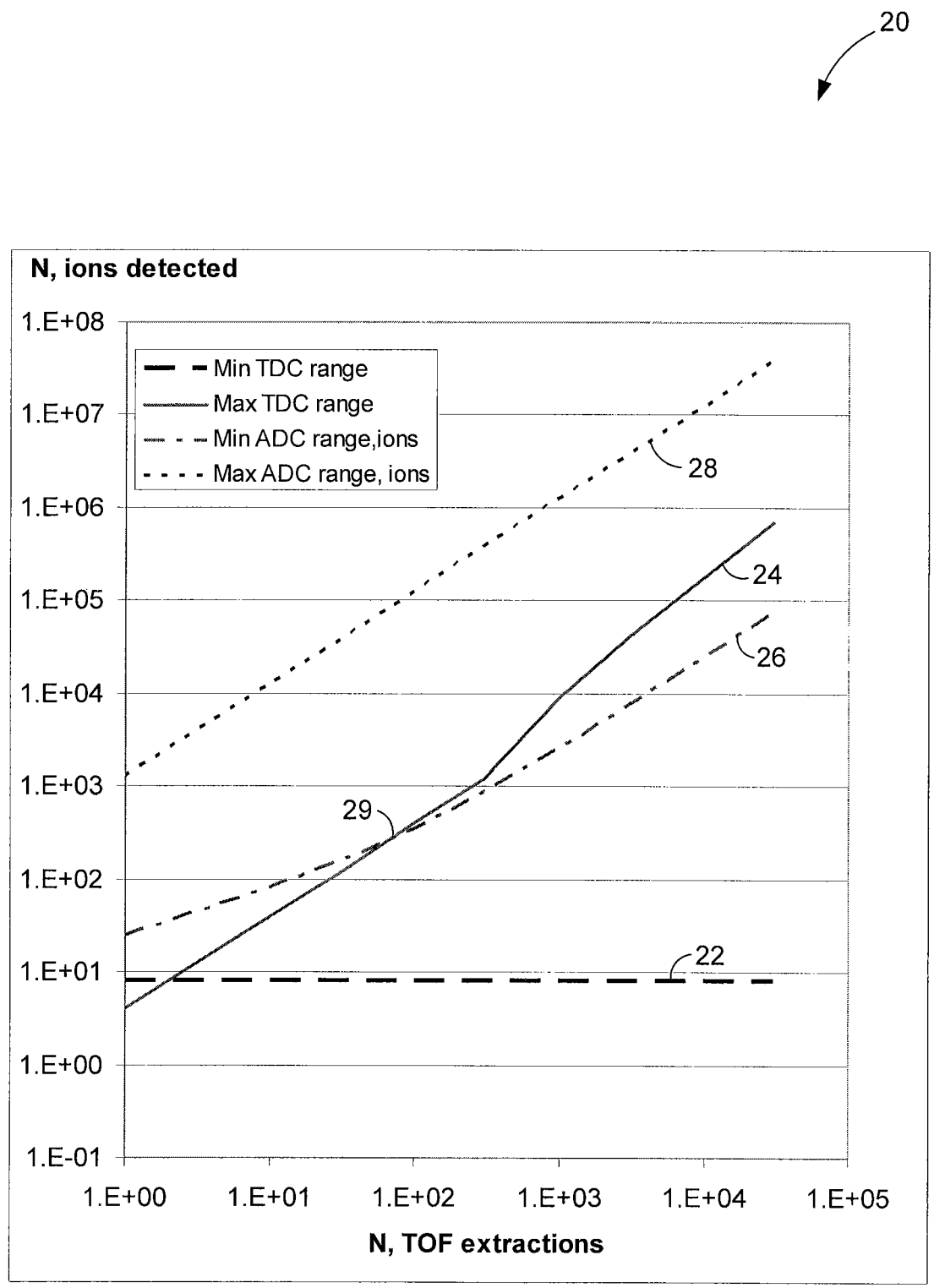
FIG. 2, in a graph, illustrates upper and lower detection limits for both TDC and ADC by plotting a number of ions detected against the number of time of flight extractions.

Reference is now made to FIG. 2, which illustrates exemplary detection limits computed for a dual TDC-ADC detection system, according to aspects of embodiments of the present invention. Graph 20 in FIG. 2 plots TOF extractions on the x-axis and detected ions on the y-axis. Curve 22 represents a lower limit of the TDC dynamic range, while curve 24 represents a corresponding upper limit. Similarly curve 26 represents a lower limit of the ADC dynamic range, and curve 28 represents a corresponding upper limit. Thus, curves 22 and 24 may define the lower intensity range of the dual TDC-ADC detection system, while curves 26 and 28 may correspondingly define the upper intensity range.

The lower limit 22 of the TDC dynamic range represents a minimum number of ions for which peak identification is possible using a TDC. For some applications, this minimum number may equal one, but for other applications the minimum number may be higher, for example five or ten, to provide more confidence in the accuracy of the measurements. A TDC can be configured to reliably detect null events through appropriate selection of a noise threshold. The upper limit 24 of the TDC dynamic range will generally depend at least on the number of parallel TDC channels, as well as the tolerance parameter specified for the saturation correction algorithm (e.g. Eq. 1 above) used to estimate the number of ions arriving at the detector. It should be appreciated that curve 24 is somewhat non-linear and grows with the number of TOF extractions.

In the case of the ADC, the lower limit 26 of the dynamic range can depend on total accumulated noise, assuming that the ADC traces are added together in the integrating transient recording fashion described above, and assuming that a certain minimum S/N ratio is prescribed for accurate measurement. Relative noise effects in the acquired data can be more pronounced in lower numbers of TOF extractions relative to larger numbers of TOF extractions. Consequently, curve 26 is more non-linear and generally flatter for low TOF extractions than at higher numbers of TOF extractions where it straightens out and increases in slope. The upper limit 28 of the ADC dynamic range can represent the maximum number of detectable ions in one extraction multiplied by the number of extractions, and can depend on the ADC signal gain, averaged ion response, and noise, as described above. Thus, it should be appreciated that the curve 28 evidences an essentially linear dependence on the number of TOF extractions. For higher numbers of TOF extractions, where noise effects are primarily due to correlated noise, curves 26 and 28 begin to run somewhat parallel.

As shown in FIG. 2, curves 24 and 26 intercept at point 29, marking the minimum number of TOF extractions for which the lower intensity range of the higher timing resolution data converter and the upper intensity range of the lower timing resolution data converter overlap. That is, beginning at intercept point 29, curve 24 representing the upper limit of the lower intensity range (of the TDC) lies above curve 26 representing the lower limit of the upper intensity range (of the ADC). For numbers of TOF extractions falling below the minimum number defined by intercept point 29, the two dynamic ranges do not overlap and, for at least those performance parameters, the dual TDC-ADC detection may be inadequate to measure certain ion fluxes falling between the two ranges. The location of intercept point 29 is indirectly controllable by controlling the trajectories of curves 22, 24, 26, 28 using the above-described performance parameters. Together with the number of TOF extractions, the above-discussed performance parameters represent a set of control parameters with which to adjust the combined dynamic range of the dual TDC-ADC detector, in accordance with aspects of embodiments of the present invention. FIG. 2 in particular highlights the fact that the number of TOF extractions is a control parameter as well. As shown in FIG. 2, intercept point 29 is located at approximately 100 TOF extractions, representing the minimum number of TOF extractions to achieve range overlap. But as detector technologies continue to improve and ion extraction rates increase, it is expected that this number can be reduced somewhat. Of course, overlap at a single TOF extraction constitutes the theoretical minimum.

Dual TDC-ADC Detection Systems

Figure 3:
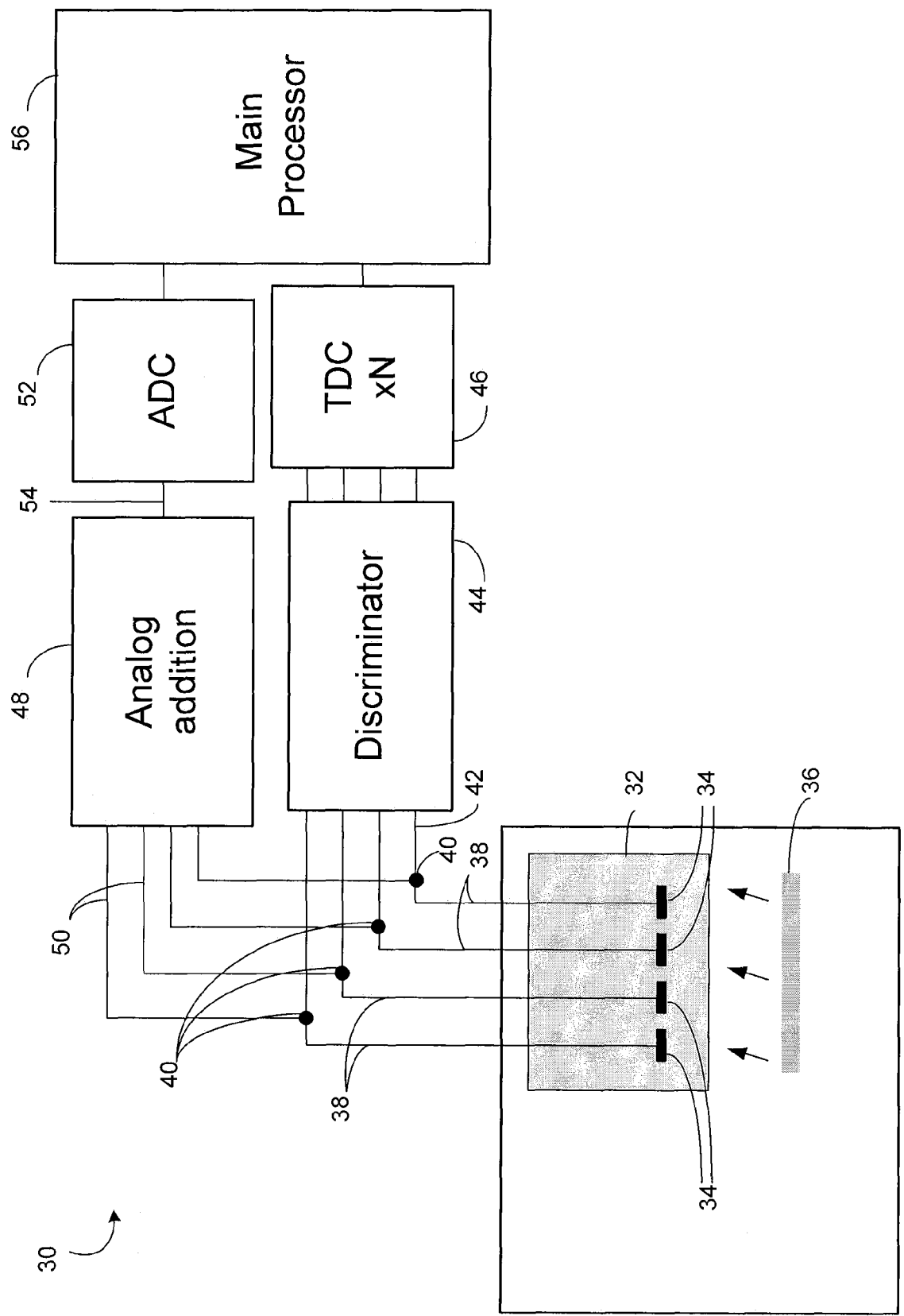
FIG. 3, in a schematic diagram, illustrates a dual TDC-ADC detection system in accordance with an aspect of an embodiment of the present invention.

Reference is now made to FIG. 3, which illustrates, in a schematic diagram, a dual TDC-ADC detection system 30 in accordance with aspects of embodiments of the present invention. The detection system 30 comprises detector 32 for detecting ions originating from an ion source and accelerated by field generator 36. The ions then travel toward detector 32 through a field-free drift chamber. As shown, detector 32 comprises four detector plates 34, though it should be appreciated that any number of detector plates may alternatively be included in the detection system 30. For example, detector 32 may comprise only a single detector plate 34, or more than four plates. As described above, in TOFMS, ions of different m/z ratios have different flight times through the field-free drift chamber to arrive at the detector 32 as a sequence of groups of ions. Each group of ions in the sequence of groups of ions can be characterized by a different m/z ratio and can comprise only ions of that m/z ratio. The ions in a given time of flight extraction may together have a plurality of different m/z ratios. The dual TDC-ADC detection system may be operable to determine a corresponding plurality of ion intensities, one intensity value for each ion population of a different m/z ratio in the plurality of m/z ratios.

As each ion group arrives at detector plates 34, the detector 32 generates a detection signal in the form of an electrical pulse (e.g. a transient pulse) that is representative of ion flight time and intensity. The timing of the transient pulse can represent ion flight time; its height can be used to estimate ion flux intensity. The detector 32 produces a sequence of detection signals (i.e. transient pulses) as a function of time over all groups of ions in a respective time of flight extraction, and potentially over all time of flight extractions in a time of flight acquisition. The sequence of detection signals may also comprise a multi-channel sequence of detection signals. The sequence of detection signals is then outputted onto signal bus 38 for downstream processing by one or more processing units. As illustrated in FIG. 3, bus 38 comprises 4 separate channels, one for each detector plate 34 in detector 32. However, it should be appreciated that the number of channels in the signal bus 38 is variable and need not, though typically will, correspond one-to-one with the number of detector plates 34 in the detector 32.

Signal bus 38 splits at signal branch 40 into a higher timing resolution data branch. Signal lines 42 can couple the output of detector 32 to the input of a higher timing resolution digital converter located on the higher timing resolution data branch. In some embodiments, the higher timing resolution digital converter comprises a discriminator 44 and TDC module 46 including one or more time to digital converters. For the purposes of the present discussion, it should be understood that the terms "multi-channel TDC" and "one or more TDCs" can be used interchangeably and are both within the scope of the present invention. The sequence of detection signals generated by detector 32 is divided at signal branch 40 into a higher timing resolution branch detection signal, and received at the input of discriminator 44.

Discriminator 44 can be used to trigger TDC module 46 by, for each transient pulse in the higher timing resolution branch detection signal, determining an approximate pulse center, and then outputting a corresponding trigger signal to the TDC module 46. The leading edge of the trigger signal will correlate with the center time of the transient pulse. For example, discriminator 44 can use peak detection methods to estimate the center times of each transient pulse. Constant fraction discriminators (CFD) perform peak detection in a manner known to those skilled in the art. Discriminator 44 may be implemented using a CFD, but it should appreciated that other types of discriminators may alternatively be used and are within the scope of the present disclosure.

The output of discriminator 44 is coupled to the input of TDC module 46. As shown in FIG. 3, TDC module 46 comprises N separate time to digital converters, each with their own channel input. Correspondingly, discriminator 44 has N channel outputs for generating N separate trigger signals. Typically, the number of separate time to digital converters in TDC 46 will also correspond one-to-one to the number of detector plates 34 included in detector 32, though the correlation need not be one-to-one although it can be advantageous to have at least that many time to digital converters. In such configurations of the detector system 30, the extra time to digital converters could simply be disabled or combined, for example. In the embodiment illustrated in FIG. 3, for example, TDC module 46 includes four parallel time to digital converters, one for each of the four detector plates 34 and the four channels in the signal bus 38. The number of time to digital converters included in TDC module 46, as described above, has a bearing on the dynamic range of the time to digital conversion portion of the detection system 30.

Each trigger signal outputted by discriminator 44 on a given output channel causes a respective time to digital converter in TDC module 46 to record a digital "1", indicative of an ion event detected at a respective detector plate 34 of the detector 32. TDC module 46 when triggered records an associated time value for the leading edge of the trigger signal, which correlates with the approximate center time of the transient pulse in the higher timing resolution branch detection signal. In this way, the TDC module 46 records an arrival time, for each ion group detected by the detector 32, which can be converted into a flight time by taking the start time of the ion group across the field-free drift chamber as a reference. It should be understood that discriminator 44 and TDC module 46 are illustrated in FIG. 3 as separate components, but in some embodiments may be included together in the higher timing resolution digital converter. It should also be appreciated that a fast onboard processor and associated device memory may also be included in the higher timing resolution digital converter. As explained further below with reference to FIG. 5, in an alternative embodiment, an ADC module operating in a TDC mode may be substituted for the TDC module 46. Alternatively, a mono-bit ADC can be used in place of a TDC and be equivalently triggered by the discriminator 44.

The higher timing resolution data converter can be operable to determine a higher timing resolution data stream as follows. Each ion group detected by the detector 32 during a time of flight extraction causes a transient pulse to be generated and transmitted to the higher timing resolution digital converter on one of the channels of signal lines 42. Discriminator 44 converts the transient pulse into a trigger signal that causes a corresponding time to digital converter in TDC module 46 to record a digital "1" and an associated time value. Thus, for each group of ions detected by the detector 32, the higher timing resolution digital converter determines at least one associated detection signal in the sequence of detection signals and records time and intensity information, wherein the at least one associated detection signal is generated by the detector 32 on detection of that group of ions.

Over multiple time of flight extractions in a time of flight acquisition, the higher timing resolution data converter can record time and intensity information for groups of ions, included in different time of flight extractions but characterized by the same m/z ratio. For each different m/z ratio, the time and intensity information recorded over all time of flight extractions for groups of ions of that m/z ratio can be processed to generate time and intensity pairs corresponding to the m/z ratios. For example, a suitably configured processor operating on the higher timing resolution data can generate the respective time and intensity pairs. The time value in the pair represents the average flight time of the group of ions; the intensity value in the pair represents a relative intensity of that group of ions in the plurality of time of flight extractions. By generating a corresponding time and intensity pair for each m/z ratio, a plurality of time and intensity pairs can be generated, wherein each time and intensity pair in the plurality corresponds to a different m/z ratio in the plurality of m/z ratios of the ions. Where the higher timing resolution digital converter comprises a multi-channel TDC, it should be appreciated that time and intensity information may be integrated across all channels as well.

Time to digital converters typically count time intervals using one or more crystal oscillators and time interpolators. Because of the low data throughput generated by TDCs, the clock cycle of the crystal oscillator is usually fairly fast, allowing the TDC to record time information using a high-resolution timing interval. Thus, the intensity value in a given time and intensity pair can be determined from a plurality of lower range intensities measured over a plurality of high resolution time intervals. It is worth noting, however, that recording time and intensity information for a single transient pulse will usually last for multiple high-resolution time intervals of the TDC module 46. More specifically, although the discriminator 44 generates trigger signals have leading edges time-synchronized to the centre times of transient pulses, the trigger signals themselves may have finite width and, in particular, may be significantly wider than the high-resolution time intervals of the TDC module 46. Until the trigger signal clears the time to digital converter, the latter may be inoperable to detect another transient pulse. The higher timing resolution digital converter may, however, generally be configurable to resolve high peak multiplicities, especially when averaged over multiple TOF extractions.

It should be appreciated that the processing steps of higher timing resolution digital converter described herein may, in some embodiments, be performed by other suitable components of the dual TDC-ADC detection system 30. For example, main processor 56, described in more detail below, could be configured in some embodiments to perform at least some of the described processing steps. Thus, main processor 56 could be configured to process the higher timing resolution data stream by, for each m/z ratio in the plurality of mass to charge ratios, integrating corresponding time and intensity pairs generated from different successive time of flight extractions, thereby to determine the plurality of time and intensity pairs representing peaks in a mass spectrum. Main processor 56 could likewise be configured to integrate time and intensity information over the multiple signal channels of the higher timing resolution digital converter to generate the plurality of time and intensity pairs. Alternatively, a converter processor associated with the higher timing resolution digital converter, which could be an onboard processor or dedicated external processor, for example, could be used to perform at least some of the herein-described processing steps, operating in conjunction with main processor 56. In some embodiments, main processor 56 could comprise the converter processor associated with the higher timing resolution digital converter.

Signal bus 38 also splits at signal branch 40 into a lower timing resolution data branch. Signal lines 50 can couple the output of detector 32 to the input of a lower timing resolution digital converter located on the lower timing resolution data branch. In some embodiments, the lower timing resolution digital converter comprises analog addition module 48 and ADC module 52 containing one or more analog to digital converters. For the purposes of the present discussion, it should again be understood that the terms "multi-channel ADC" and one "or more ADCs" can be used interchangeably and are both within the scope of the present invention. The sequence of detection signals generated by detector 32 is divided at signal branch 40 into a lower timing resolution branch detection signal, and received at the input of analog addition module 48.

Analog addition module 48 can comprise a number of input channels, which can be in one-to-one correspondence with the number of detector plates 34 in detector 32, and the number of channels included in signal bus 38. But analog addition module 48 may also be coupled to only a subset of the channels included in signal bus 38. Alternatively, analog addition module 48 can comprise additional input channels, in which case the excess channels could simply be disabled in the detection system 30. The analog addition module 48 can operate by adding together individual channels of the lower timing resolution branch detection signal to generate an aggregate detection signal. Since each channel carries a detection signal for one detector plate 34 of the detector, the aggregate detection signal would represent time and intensity information for the whole detector 32. Inclusion of analog addition module 48 in the dual TDC-ADC detection system 30 avoids the use of a multi-channel analog to digital converter in ADC module 52, which tend to be costlier than single channel analog to digital converters, a point which is discussed further below.

Signal line 54 couples the output of the analog addition module 48 to the input of ADC module 52, which comprises one or more ADCs. Where analog addition module 48 is included in the lower timing resolution digital converter, ADC module 52 may only comprise a single analog to digital converter. ADC module 52 digitizes the aggregate data signal, as is generally known, by sampling the aggregate data signal at a low-resolution time interval and then quantizing the samples to a corresponding one of the ADC bins, to generate a digitized version of the aggregate data signal on its output channel.

In some embodiments, the lower timing resolution digital converter further comprises an attenuator for applying an attenuation factor to the lower timing resolution branch detection signal before input into the analog addition module 48. Applying an attenuation factor to the lower timing resolution branch detection signal, in effect, compresses the height of the signal. Since the ADC module 52 generally has a finite input signal range, applying the attenuation factor can thereby increase the upper limit of the measurable input range of the ADC module 52 by compressing a larger intensity range into the input signal range of the analog to digital converter. Ion intensity can then be determined by up-scaling the output quantization level of the ADC module 52 by the applied quantization factor, to reconstruct the original lower timing resolution branch detection signal amplitudes (notwithstanding any residual quantization errors). Averaged ion response may also be used to determine ion intensity. In particular, the applied attenuation factor can be determined so that at least half of the lower intensity range of the higher timing resolution digital converter is below and outside the upper intensity range of the lower timing resolution digital converter. For example, a suitably configured processor, such as main processor 56, can determine and control the attenuation factor. It should be appreciated that the attenuator can be located in the lower timing resolution branch data path either upstream or downstream of the analog addition module 48, and may in some embodiments be included within either the analog addition module 48 or the ADC module 52, or any other suitable location within the detection system 30. It should be understood that analog addition module 48 and ADC module 52 are illustrated in FIG. 3 as separate components, but in some embodiments may be included together in the lower timing resolution digital converter, which may also include an attenuation module, as the case may be.

The lower timing resolution data converter can be operable to determine a lower timing resolution data stream as follows. Each ion group detected by the detector 32 during a time of flight extraction causes a transient pulse to be generated and transmitted to the lower timing resolution digital converter on one of the channels of signal lines 50. Analog addition module 48 adds together the respective channels of the lower timing resolution branch detection signal into an aggregate detection signal. In some embodiments, an attenuator will apply an attenuation factor to adjust the signal height range of the aggregate detection signal according to the input signal range of the ADC module 52. The aggregate detection signal is then digitized by the ADC module 52 to generate a digitized signal representing ion intensity detected by the detector 32 as a function of time. As the ADC module 52 samples once every low-resolution time interval, the digitized detection signal will comprise a plurality of higher range intensity measurements for a corresponding plurality of low-resolution time intervals. The lower timing resolution data stream can then be provided to a suitable downstream processor for signal processing, to determine a plurality of higher range intensity measurements of the sequence of detection signals.

Various techniques can be implemented to reduce the data throughput of the ADC module 52 to the main processor 56. For example, ADC module 52 can further comprise some onboard processing to process the lower timing data resolution data stream before transmission to the main processor 56. In some embodiments, higher range intensity measurements from different TOF extractions can be summed together, or alternatively averaged, before transmission. The amount of raw data transmitted to the main processor 56 can thereby be reduced by performing some preliminary signal processing at the ADC module 52. This can be important for fast TOF application, or where data bus speed is limited.

As another example, the timing of data transmission from the ADC module 52 to the main processor 56 can be controlled based upon the output of the TDC module 46. Even though the ADC module 52 may be continually sampling and digitizing the sequence of detection signals, it may not always be recording useful ion intensity data. The sequence of detection signals may only include noise during the intervals between ion events at the detector 32. Individual ion events detected by the TDC module 46 can be correlated with useful ion intensity information in the higher timing resolution data stream to avoid transmission of useless or redundant noise information. For example the higher range intensity measurements can be buffered and then divided into segments containing useful ion intensity information and segments containing only noise using the output of the TDC module 46. Only the useful segments can be transmitted to the main processor 56 as the higher timing resolution data stream. It should be appreciated that main processor 56 is illustrated as a lumped element, but that in some embodiments the processor can be distributed throughout the system 30, including some onboard processing at the ADC module 52.

In accordance with aspects of embodiments of the present invention, the higher timing resolution digital converter is operable to measure ion intensities that are generally lower than the ion intensities measurable by the lower timing resolution digital converter, though the dynamic ranges of the two digital converters may overlap. Thus, the lower timing resolution digital converter is operable to measure intensities above a maximum intensity determinable by the higher timing resolution digital converter. Of course, the higher timing resolution digital converter may then operate at a higher timing resolution relative to the lower timing resolution of the lower timing resolution digital converter as a tradeoff. By combining the intensity information generated by the two digital converters, the dynamic range of the dual TDC-ADC detection system 30 can advantageously exceed what either the higher timing resolution digital converter or the lower timing resolution digital converter could achieve individually.

Main processor 56 can be coupled to both TDC module 46 and ADC module 52 for receiving and processing the higher timing resolution data stream and lower timing resolution data stream, respectively, to determine a plurality of ion intensities. Each determined ion intensity can correspond to a different m/z ratio of ions, such that main processor 56 can determine an ion intensity for each ion concentration of a different m/z ratio obtained during the time of flight acquisition. Main processor 56 is operable to combine the higher timing resolution data stream and the lower timing resolution data stream to generate a combined data set comprising, in at least some embodiments, intensity information from both data streams. In some embodiments, generating the combined data set comprises comparing the intensity values in the higher timing resolution data stream with the intensity measurements in the lower timing resolution data stream to determine which intensity value is to be included in the combined data set. It should be appreciated that main processor 56 may include any suitably configured computing unit, including but not limited to a Field-Programmable Gate Array (FPGA), a Central Processing Unit (CPU), a Digital Signal Processor (DSP), a General Purpose Graphics Processing Unit (GPGPU), or any possible combination of the like.

As described above, the higher timing resolution data converter will generally be able to measure a lower intensity range relative to the higher intensity range of the lower timing resolution. Accordingly, one approach to combining the two data streams is to define an intensity condition of the higher timing resolution data stream, and then generate the combined data set based on the outcome of the intensity condition. The intensity condition may be any suitable condition by which to determine whether or not the higher timing resolution digital converter is providing accurate and trusted intensity information, in other words that the ion intensities being measured lie within the dynamic range of the high timing resolution data converter. The intensity condition being satisfied can indicate that the intensity information from the higher timing resolution data stream is potentially inaccurate and not to be trusted. Accordingly, if the intensity condition is satisfied, then main processor 56 can instead include intensity information taken from the lower timing resolution data converter into the combined data set; otherwise main processor 56 can include intensity information taken from the higher timing resolution data into the combined data set.

For each time and intensity pair in the higher timing resolution data stream (corresponding to time and intensity information for a different m/z ratio in the plurality of m/z ratios), main processor 56 can determine a corresponding ion intensity in the combined data set using the following steps. First, main processor 56 can determine if the intensity condition of the higher timing resolution digital converter is satisfied in respect of a given time and intensity pair. Then, if the intensity condition is not satisfied (i.e. if the intensity value can be trusted), then main processor 56 can select that intensity value to represent the intensity of ions having a corresponding m/z ratio in the combined data set. But if main processor 56 determines that the intensity condition is satisfied (i.e. that the ion intensity being measured exceeds the dynamic range of the higher timing resolution digital converter), then main processor 56 can determine the corresponding ion intensity in the combined data set from the plurality of higher range intensity measurements generated from the lower timing resolution data stream. Using this logic, main processor 56 can select time and intensity information from either the high timing resolution data stream or the lower timing resolution data stream for inclusion in the combined data set, such that the combined data set comprises a plurality of ion intensities, one intensity for each m/z ratio of ions in the time of flight acquisition.

To determine corresponding ion intensities from the higher range intensity measurements in the lower timing resolution data stream, main processor 56 can search the intensity measurements for a signal peak located at approximately the time value in the time and intensity pair. A suitable peak detection algorithm may be used here with optional noise thresholding in order to avoid false positives. Once a corresponding signal peak has been located, its output quantization level can be converted into an intensity value based on the theoretical performance parameters of the ADC, such as averaged ion response, and any attenuation factor applied to the lower timing resolution branch detection signal. In such cases, the timing of the signal peak can be determined also from the intensity measurements, or alternatively taken as the time value in the corresponding time and intensity pair.

For greater clarity, main processor 56 can determine if the intensity condition of the higher timing resolution digital converter is satisfied for a given time and intensity pair based on the higher range intensity measurements. As above, main processor 56 can search the intensity measurements for a signal peak located at approximately the time value in the time and intensity pair, and determine an ion intensity represented by the signal peak. If the determined ion intensity exceeds the maximum intensity determinable by the higher timing resolution digital converter, then processor 56 can conclude that the intensity condition is satisfied. If on the other hand the determined ion intensity does not exceed the maximum intensity determinable, in which case the measured ion intensity falls within the dynamic range of the higher timing resolution digital converter, then main processor 56 can determine that the intensity condition is not satisfied. As described above, main processor 56 is operable to generate the combined data set from the two data streams based on the state of the intensity condition.

In other embodiments, main processor 56 can determine if the intensity condition is satisfying according to other means. For example, main processor 56 can determine that the intensity condition is satisfied by determining that the one or more time to digital converters in the TDC module 46 are saturated, or very nearly saturated. In that case, main processor 56 can determine the corresponding ion intensities from the plurality of higher range intensity measurements. Other means to determine if the intensity condition is satisfied may be suitable and are within the scope of the invention.

As the corresponding ion intensities may be determined over a plurality of time of flight of extractions, in some embodiments, main processor 56 is further operable to aggregate intensity information, in respect of both the higher timing resolution data stream and the lower timing resolution data stream, over multiple time of flight extractions. As described above, a composite time of flight spectra may be generated as an aggregate of multiple individual spectra. In each time of flight extraction, ion groups of the same m/z ratios are accelerated into the field-free drift chamber for detection by the detector 32, and then processed using either the higher timing resolution digital converter or the lower timing resolution digital converter and the main processor 56 to generate a corresponding spectrum for that time of flight extraction. These individual spectra are then aggregated to generate a composite spectrum, which may be the product of about 100 to 1000 separate time-of-flight extractions, or some other number.

For each time of flight extraction, ions are mass-selectively pushed through the field-free drift chamber as an extraction-specific sequence of groups of ions, wherein each group of ions in the extraction-specific sequence of groups of ions comprises ions of a different m/z ratio in a plurality of m/z ratios. In aggregate, the plurality of time of flight extractions form a time of flight acquisition, and the extraction-specific sequences of groups of ions form a sequence of groups of ions for the time of flight acquisition. For each group of ions in a respective time of flight extraction, the detector 32 can generate a transient pulse (e.g. a detection signal) in the sequence of detection signals provided to signal bus 38.

For each time of flight extraction, the sequence of detection signals can be provided to the higher timing resolution digital converter by way of signal lines 42, and to the lower timing resolution digital converter by way of signal lines 50, to generate extraction-specific time and intensity information. The TDC module 46 can determine an extraction-specific time and intensity pair, for each group of ions in a time of flight extraction, representing a flight time and intensity for ions of that m/z ratio in the time of flight extraction. In this way the TDC module 46 can determine an extraction-specific plurality of time and intensity pairs over the duration of the given time of flight extraction. Similarly the ADC module 52 can digitize the sequence of detection signals at low-resolution time intervals, for the duration of the time of flight extraction, to generate an extraction-specific plurality of intensity measurements, which can be higher range intensity measurements.

Over the duration of the time of flight acquisition, the main processor 56 can aggregate the extraction-specific time and intensity information provided by each digital converter. In the case of the higher timing resolution digital converter, aggregating the extraction-specific pluralities of time and intensity pairs can comprise, for like time values, adding together the corresponding intensity value in a time and intensity pair taken from each different time of flight extraction. The time values in each extraction-specific plurality of time and intensity pairs should be approximately the same for groups of ions characterized by the same m/z ratio. In other words, the plurality of extraction-specific plurality of time and intensity pairs can be aggregated by associating like time values in each extraction-specific plurality, and then adding the corresponding intensities, to provide a single plurality of time and intensity pairs for all of the extractions. As part of this process, main processor 56 can average the associated time values from different time of flight extractions, assuming the time values are not identical.

In a similar manner, main processor 56 can integrate the extraction-specific plurality of intensity measurements over the duration of the time of flight acquisition. That is, main processor 56 can align each extraction-specific plurality of intensity measurements generated by the lower timing resolution digital converter according to the low-resolution time intervals, and integrate corresponding intensity measurements within the time of flight extractions having the same aligned time values. Put another way, each extraction can be divided into a plurality of low-resolution time intervals, for each of which the ADC module 52 determines an intensity measurement. The low-resolution time intervals for different extractions can be aligned, such that intensity measurements taken by the ADC module 52 during aligned low-resolution time intervals will correspond to a measured intensity of ions characterized by the same m/z within different extractions of the time of fight acquisition. These aligned intensity measurements can then be piecewise added by the main processor 56 to determine a plurality of intensity measurements for the entire time of flight acquisition. Main processor 56 can then combine the plurality of intensity measurements with the plurality of time and intensity pairs, as described above, using a suitably defined intensity condition to determine the combined data set.

In some embodiments, the plurality of time of flight extractions is a selected number of time of flight extractions, the selected number being an integer greater than one, so that one or more characteristics of the dual TDC-ADC detection system 30 are optimized or otherwise controlled. According to aspects of embodiments of the present invention, the number of time of flight extractions can be selected to optimize or otherwise control the dynamic range of the dual TDC-ADC detection system 30. For example, the number of time of flight extractions can be selected to adjust an upper limit of the lower intensity range (of the higher timing resolution data stream), and a lower limit of the upper intensity range (of the lower timing resolution data stream), such that the lower intensity range overlaps with the upper intensity range for that selected number of TOF extractions. As described above, there may be a theoretical minimum number of time of flight extractions for which the upper intensity range and the lower intensity range will overlap (illustrated by intercept point 29 in FIG. 2). Thus, the number of time of flight extractions may be selected to be above this theoretical minimum number to ensure overlap. The number of time of flight extractions can also be selected, in conjunction with other ADC/TDC performance parameters, to adjust other limits of the upper and lower intensity ranges, thereby to control the lower and upper limits of the overall dynamic range of the dual TDC-ADC detection system 30.

In all such cases, the described processing steps of main processor 56 can be performed for each of the selected number of time of flight extractions. The TDC module 46 can determine an extraction-specific plurality of time and intensity pairs for each of the selected number of time of flight extractions. Likewise the ADC module 52 can determine an extraction-specific plurality of intensity measurements for each of the selected number of time of flight extractions. Main processor 56 can then aggregate these two data streams, as described, over the time of flight acquisition to determine the final plurality of time and intensity pairs and intensity measurements. The intensity condition can then be used to combine the data streams into the combined data set comprising intensity information taken from each data stream.

Alternative Embodiments of the Dual TDC-ADC Detection System

Reference is now made to FIGS. 4 to 7, which illustrate, in respective schematic diagrams, alternative embodiments of dual TDC-ADC detection system 30, in accordance with aspects of embodiments of the present invention. For convenience, like reference numbers plus multiples of 100 will be used to denote like components of these alternative embodiments, and discussion of like components may be abbreviated so as to not obscure certain other details of these alternate embodiments.

Figure 4:
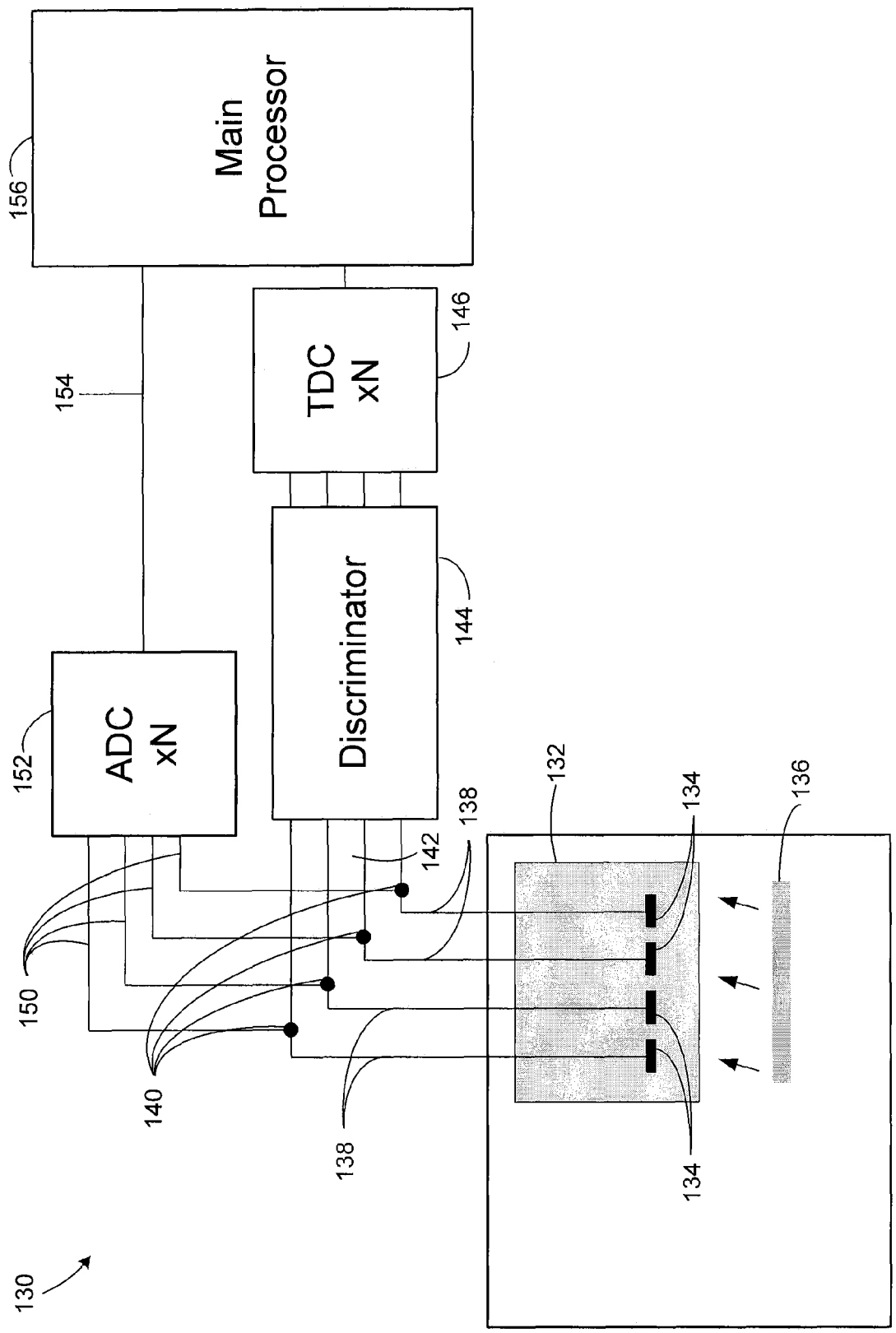
FIG. 4, in a schematic diagram, illustrates an alternate dual TDC-ADC detection system in accordance with an aspect of an embodiment of the present invention.

Referring now to FIG. 4 specifically, illustrated therein is a dual TDC-ADC detection system 130. The detection system 130 comprises ion detector 132 having a plurality of detection plates 134 for detecting ions accelerated from an ion source by field generator 136 into a field-free drift chamber. As ions of different m/z ratios arrive at the plurality of plates 134, the detector 132 generates an electrical pulse representative of ion intensity, to produce a sequence of detection signals as a function of time. The sequence of detection signals is outputted along signal bus 138, which can be an N-channel bus in one-to-one correspondence with the number of detector plates 134. The sequence of detection signals is divided into a higher timing resolution branch detection signal and a lower timing resolution branch detection signal at signal branch 140. Signal lines 142 couple the input of the discriminator 144 to the output detector 132 for transmission of the higher timing resolution branch detection signal. Discriminator 144 and TDC module 146 form a higher timing resolution digital converter and, in operation, generate a higher timing resolution data stream. Where the time of flight acquisition comprises a plurality of time of flight extractions, discriminator 144 and TDC module 146 generate an extraction-specific plurality of time and intensity pairs, one for each time of flight extraction, for transmission to the main processor 156 for integration to generate the plurality of time and intensity pairs.

Dual TDC-ADC detection system 130 differs from dual TDC-ADC detection system 30 by inclusion of ADC module 152, which can be functionally equivalent to the combination of analog addition module 48 and ADC module 52 in detection system 30. Analog to digital module 152 comprises an N-channel analog to digital converter coupled to the N channels of signal bus 138. Of course, it should be appreciated that ADC module 152 could alternatively comprise an M-channel analog to digital converter, M>N, coupled to the N channels of the signal bus 138. Each channel in the ADC module 152 can be used to digitize a channel of the lower timing resolution branch detection signal, to generate a corresponding plurality of intensity measurements taken at low-resolution timing intervals. Each respective plurality of intensity measurements can then be internally summed in ADC module 152, and outputted as an aggregated plurality of intensity measurements along signal line 154 to main processor 156. The aggregated plurality of intensity measurements can then be provided to the main processor 156, or some other processor, for signal processing.

Whereas in the dual TDC-ADC detection system 30, the N channels of the sequence of detection signals are summed in analog addition module 48 prior to input into the ADC module 52, in the dual TDC-ADC detection system 130, the N channels are individually digitized before summing in the ADC module 152. The overall operation of the analog to digital conversion is the same, or substantially similar, in the two systems 30 and 130. However, due to the generally large cost of fast analog to digital converters, the detection system 130 may be unnecessarily expensive as compared to the detection system 30 for the same or substantially similar performance. Main processor 156 can have the same operating functionalities as the main processor 56 and is not limited in operation to the processes described. Main processor 156 can be operable to perform additional functions as required and as understood by those skilled in the art. It should also be understood that main processor 156 may have onboard memory or, alternatively, may be connected to external memory, and that other processing units included in the detection system 130 may instead be used to perform the herein-described processing steps. Main processor 156 can be an FPGA, CPU, DSP, GPGPU, or any combination of the like.

Figure 5:
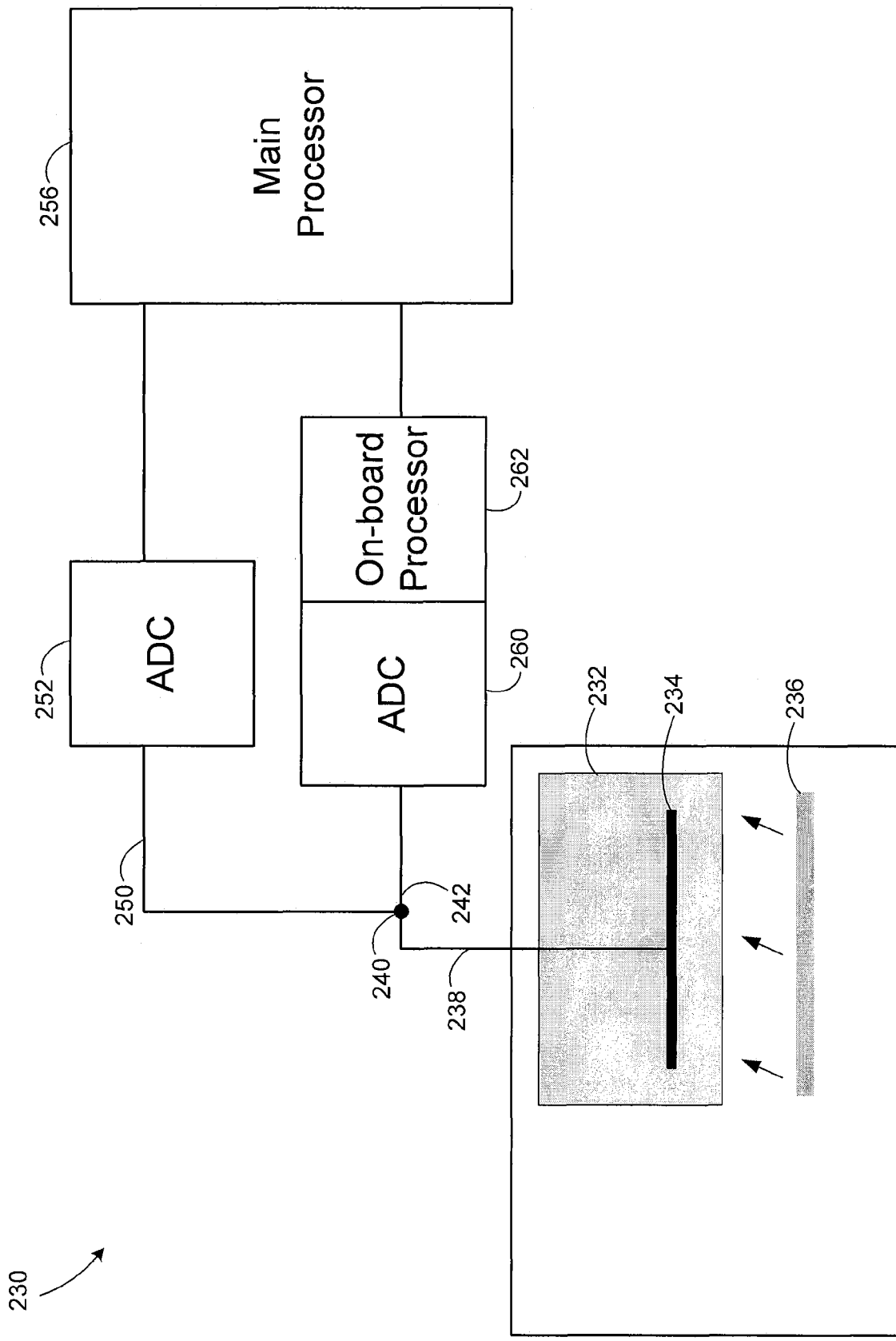
FIG. 5, in a schematic diagram, illustrates yet another alternate dual TDC-ADC detection system in accordance with an aspect of an embodiment of the present invention.

Referring now to FIG. 5 specifically, illustrated therein is a dual TDC-ADC detection system 230. The detection system 230 comprises ion detector 232 having detector plate 234 for detecting ions accelerated from an ion source by field generator 236 through a field-free drift chamber. As ions of different m/z ratios arrive at detector plate 234, the detector 232 generates an electrical pulse representative of ion intensity, to produce a sequence of detection signals as a function of time. The sequence of detection signals is outputted along signal bus 238, which is a single channel bus as illustrated in FIG. 5. Of course, it should be appreciated that, according to some embodiments, the detection system 230 can be modified to include a plurality of detector plates and a corresponding plurality of channels in signal bus 238 in one-to-one correspondence with the number of detector plates. The sequence of detection signals is divided into a higher timing resolution branch detection signal and a lower timing resolution branch detection signal at signal branch 240. Signal lines 250 couple the input of the input of ADC module 252 to the output detector 232 for transmission of the lower timing resolution branch detection signal. ADC module 252 digitizes the lower timing resolution branch detection signal for downstream processing to generate a plurality of intensity measurements. For example, main processor 256 can be coupled to the ADC module 252 for processing the lower timing resolution data stream.

Dual TDC-ADC detection system 230 differs from TDC-ADC detection system 30 by inclusion of ADC module 260 operating in a TDC mode and on-board processor 262 to replace the TDC module 46 in detection system 30. By adjusting its input signal gain (or equivalently its input signal attenuation), the analog to digital converter included in ADC module 260 can be configured to record distinct ion events. That is, transient pulses associated with signal ions will become measurable if the input signal gain of the ADC is made large enough. On-board processor 262, or equivalently main processor 256, can then function, essentially as a constant fraction discriminator, to detect the timing of the individual transient pulses. In this way, on-board processor 262 can be configured to identify time and intensity pairs. Accordingly, in so-called TDC mode, the ADC module 260 in conjunction with a suitable downstream processor can record the timing of individual ion events.

However, it should be understood that the ADC module 260 in TDC mode may only provide an approximate count of the number of ions involved in an ion event at the detector 234. For example, electron multiplication in the detector 232 may not always generate a transient pulse of the same amplitude for a single recorded ion. A single ion may in one case generate a 3 mV pulse, while a single ion may in another case generate a 5 mV pulse. True threshold detectors, such as TDC, will indiscriminately record each transient pulse as a single ion event, provided the pulse amplitudes exceed the TDC threshold. However, the ADC module 260 operating in TDC may only estimate an ion count based upon its operating parameters, described above, such as averaged ion response.

On-board processor 262 can also be used to improve the timing resolution of ADC module 260. The ADC itself may still be limited by its low-timing resolution. However, when operated in TDC mode, on-board processor 262 may implement techniques to interpolate sub-intervals of the ADC low-resolution time intervals, to record the arrival times of the transient pulses with higher overall timing resolution than the ADC could provide alone. Optionally, on-board processor 262 can also implement noise thresholding, so that noise on the detector channel is not mistaken for an ion transient pulse. On-board processor 262 can be configured for other known signal processing techniques as well.

Figure 6:
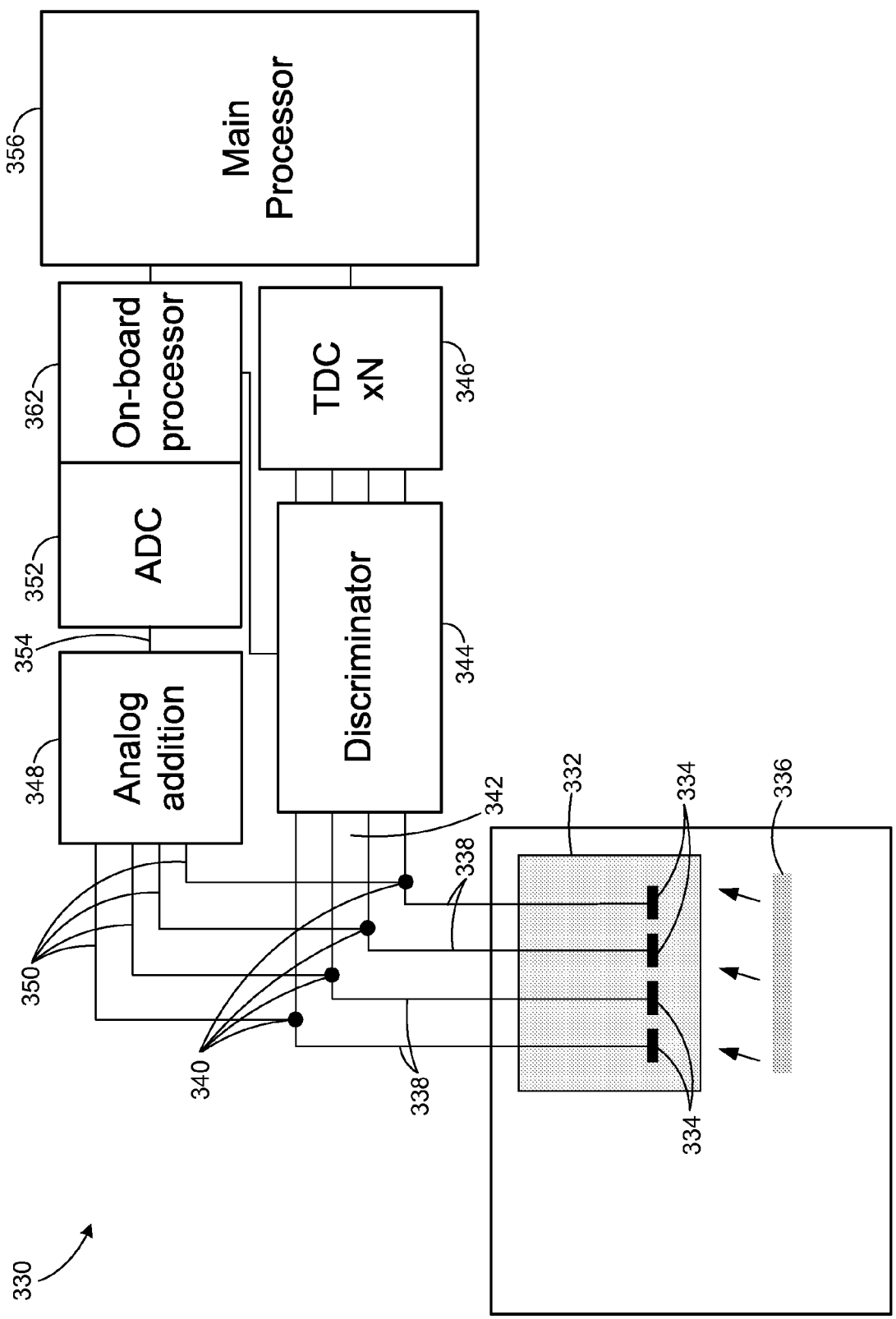
FIG. 6, in a schematic diagram, illustrates yet another alternate dual TDC-ADC detection system in accordance with an aspect of an embodiment of the present invention.

Referring now to FIG. 6 specifically, illustrated therein is a dual TDC-ADC detection system 330. The detection system 330 comprises ion detector 332 having a plurality of detection plates 334 for detecting ions accelerated from an ion source by field generator 336 into a field-free drift chamber. As ions of different m/z ratios arrive at the plurality of plates 334, the detector 332 generates an electrical pulse representative of ion intensity, to produce a sequence of detection signals as a function of time. The sequence of detection signals can be outputted along signal bus 338 to signal branch 340, at which point the sequence of detection signals is divided into a higher timing resolution branch detection signal and a lower timing resolution branch detection signal. Signal lines 342 couple the input of the discriminator 344 to the output of detector 332 for transmission of the higher timing resolution branch detection signal. Discriminator 344 and TDC module 346 form a higher timing resolution digital converter and, in operation, generate a high timing resolution data stream. Where the time of flight acquisition comprises a plurality of time of flight extractions, discriminator 344 and TDC module can generate an extraction-specific plurality of time and intensity pairs, one plurality for each time of flight extraction, for transmission to the main processor 356 for processing.

Dual TDC-ADC detection system 330 differs from dual TDC-ADC detection 30 by inclusion of on-board processor 362 in ADC module 352. On-board processor 362 increases the computational power of the ADC module 352 and generates time information for the digitized aggregate detection signal outputted by ADC module 352. For example, on-board processor 362 can process a digitized detection signal generated by ADC module 352 to identify signal peaks, corresponding to ion events at the detector 332, and then determine timing information for each detected peak. In this way, on-board processor 362 can determine flight times for each group of ions in the time of flight extraction, corresponding to each peak in the digitized detection signal. As described above, on-board processor 362 can also be used to reduce the data throughput of the ADC module 352 in various ways. Performing some preliminary signal processing on the higher range intensity measurements, such as adding or averaging, can reduce the amount of raw data transmitted to the main processor 362.

Data throughput can also be reduced by using the output of the TDC module 346 to isolate segments of the higher range intensity measurements containing useful ion intensity information, and transmit only those segments to the main processor 356 as the lower timing resolution data stream, thereby discarding segments of the higher range intensity measurements containing only noise information. For example, discriminator 344 and on-board processor 362 can be connected via a digital signaling line, as shown in FIG. 6. The digital signaling line can carry threshold-crossing information from the discriminator 344 to the on-board processor 362. This threshold-crossing information can be in High state when the detector signal is above the threshold (i.e. it contains useful ion intensity information) or in the Low state when the detector signal is below the threshold (i.e. it contains only noise information). In this way, the digital signaling line can serve as an enable signal for the ob-board processor 362 to control when the higher range intensity measurements are transmitted to the main processor 356. Alternatively, the digital signaling line can connect the on-board processor 362 to the TDC module 346 to achieve the same result.

Figure 7:
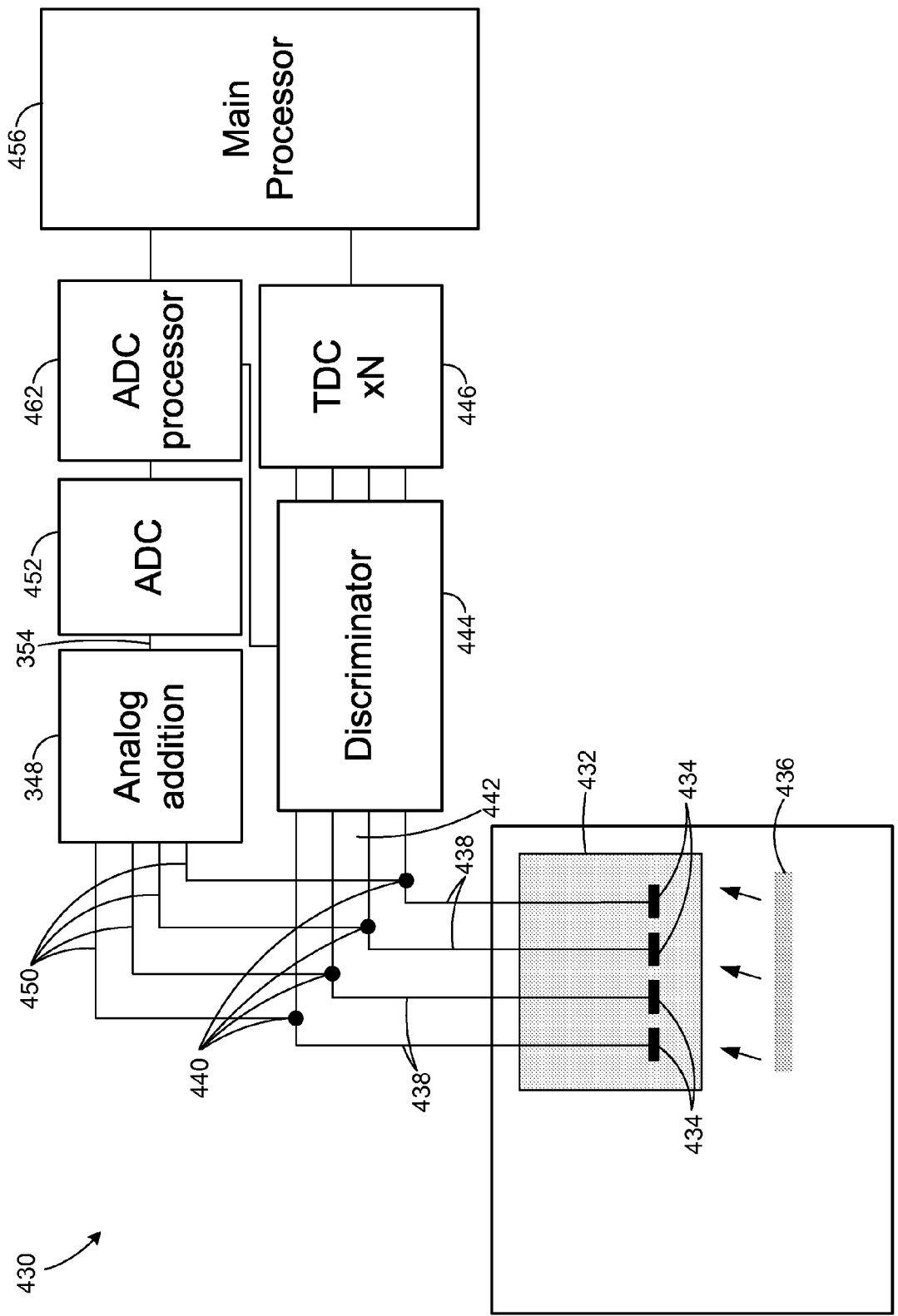
FIG. 7, in a schematic diagram, illustrates yet another alternate dual TDC-ADC detection system in accordance with an aspect of an embodiment of the present invention.

Referring now to FIG. 7 specifically, illustrated therein is a dual TDC-ADC detection system 430. The detection system 430 comprises ion detector 432 having a plurality of detection plates 434 for detecting ions accelerated from an ion source by field generator 436 into a field-free drift chamber. As ions of different m/z ratios arrive at the plurality of plates 434, the detector 432 generates an electrical pulse representative of ion intensity, to produce a sequence of detection signals as a function of time. The sequence of detection signals is outputted along signal bus 438 to signal branch 440, at which point the sequence of detection signals is divided into a higher timing resolution branch detection signal and a lower timing resolution branch detection signal. Signal lines 442 couple the input of the discriminator 444 to the output of detector 432 for transmission of the higher timing resolution branch detection signal. Discriminator 444 and TDC module 446 form a higher timing resolution digital converter and, in operation, generate a high timing resolution data stream. Where the time of flight acquisition comprises a plurality of time of flight extractions, discriminator 444 and TDC module can generate an extraction-specific plurality of time and intensity pairs, one plurality for each time of flight extraction, for transmission to the main processor 456 for integration. A digital signaling line carrying threshold-crossing information can connect discriminator 444 to ADC processor 462, as described above, to control when the higher range intensity measurements are transmitted from the ADC module 452 to the main processor 456. The digital signaling line can also connect the ADC processor 462 to the TDC module 446 to achieve the same result.

Dual TDC-ADC detection system 430 differs from dual TDC-ADC detection system 330 in that ADC processor 462, associated with and externally coupled to ADC module 452, replaces onboard processor 362. ADC processor 462 otherwise can function the same or substantially similar to onboard processor 362. It should be appreciated that main processor 456, in some embodiments, could perform at least some of the functionalities of ADC processor 462.

Each of the herein-described alternative embodiments of dual TDC-ADC system 30 are otherwise functionally equivalent to the system 30 for processing ions.

Dynamic Range Modeling Experiments

Figure 8:
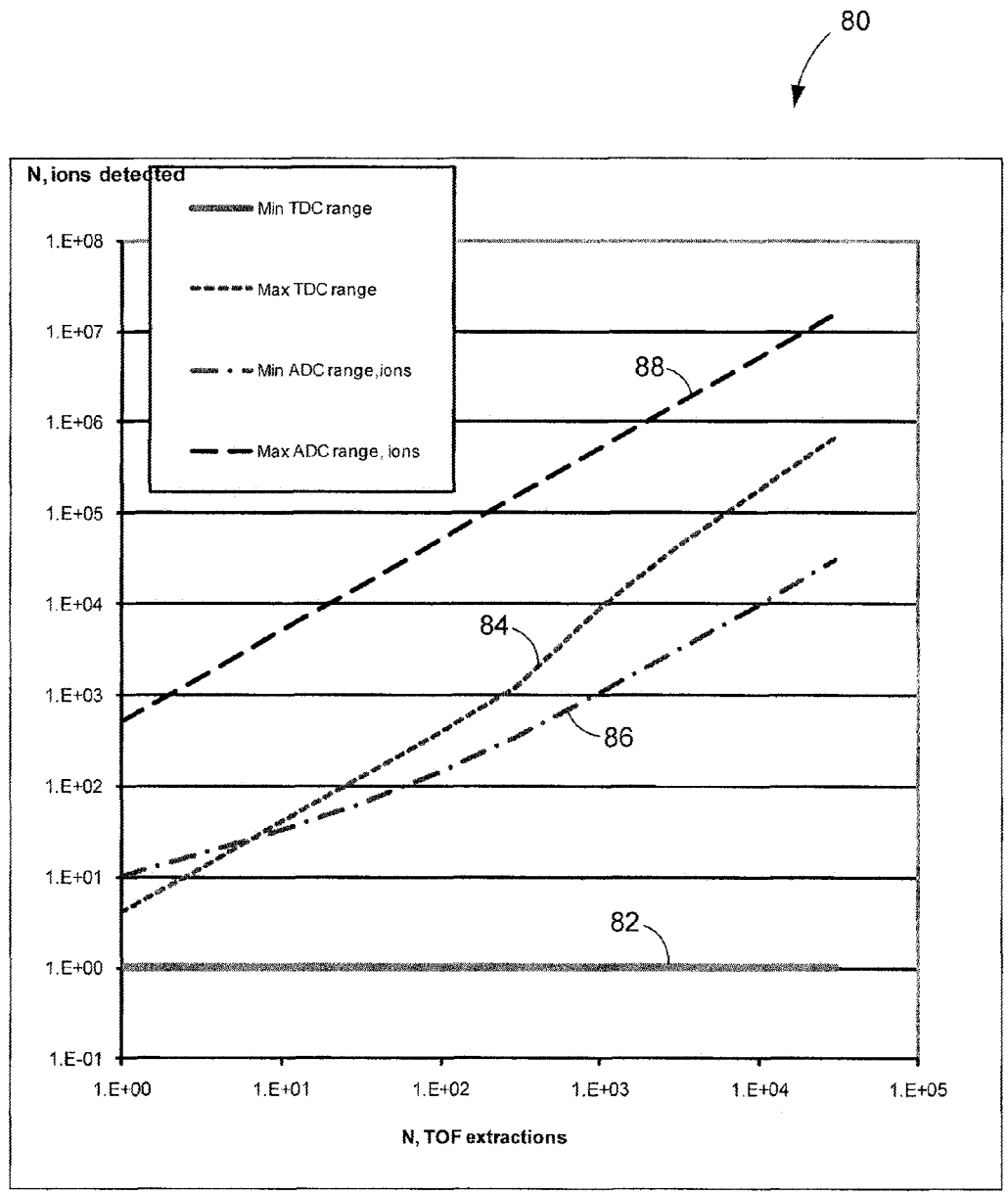
FIG. 8, in a graph, illustrates upper and lower detection limits for both TDC and ADC by plotting a number of ions detected against the number of time of flight extractions.

Reference is now made to FIG. 8, which in a graph illustrates the upper and lower bounds of the TDC and ADC in a dual TDC-ADC detection system. Graph 80 in FIG. 8 plots the number of TOF extractions on the x-axis and the number of detected ions on the y-axis. Curve 82 represents a lower limit of the TDC dynamic range, while curve 84 represents a corresponding upper limit. Similarly curve 86 represents a lower limit of the ADC dynamic range, and curve 88 represents an upper limit of the ADC dynamic range. Thus, the curves shown indicate maximum and minimum number of ions, as a function of the number of TOF extractions, which can be reliably recorded with TDC and ADC. As above, the minimum number of recordable ions could be greater than one, such as 5 or 10, for example.

The curves shown model the theoretical dynamic range of a dual TDC-ADC system having the following performance parameters:

TDC channels=4
TDC saturation correction, acceptable tolerances=0.03
ADC number of bins=256
ADC uncorrelated noise=1 bin
ADC correlated noise=0.1 bin
Averaged ion response in ADC bins=0.5

As can be seen from FIG. 8, for less than ten TOF extractions, under the above conditions, the detection ranges for TDC and ADC start to overlap. That is, the upper limit 84 of the lower intensity TDC dynamic range exceeds the lower limit 86 of the upper intensity ADC dynamic range. The lower limit 82 of the lower TDC range, together with the upper limit 88 of the ADC range, define the overall dynamic range of the dual TDC-ADC detection system, for numbers of TOF extractions above which the upper limit 84 exceeds lower limit 86, of course. This can provide a range of ion intensities where both the TDC and ADC can provide good quality data, which can then be cross-related to correlate the time and intensity pairs generated by the TDC and the intensity measurements generated by the ADC. According to some aspects of embodiments of the present invention, five orders of overall dynamic range after just 200 time-of-flight extractions can be achieved. With so few TOF extractions required to achieve five orders of dynamic range, 100 spectra/second can theoretically be generated, given a 20 kHz time-of-flight extraction rate.

Figure 9:
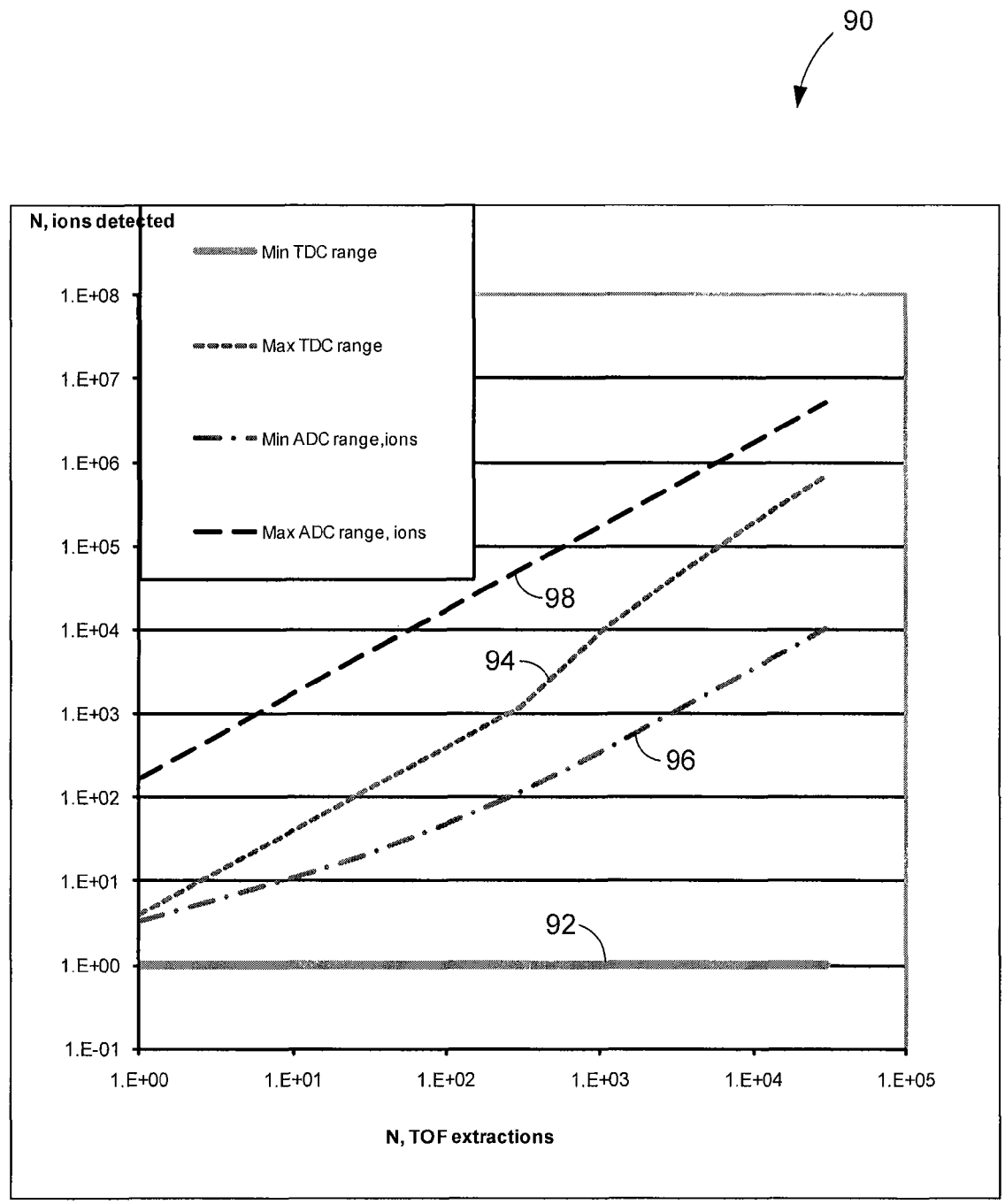
FIG. 9, in a graph, illustrates other upper and lower detection limits for both TDC and ADC by plotting a number of ions detected against the number of time of flight extractions.

Reference is now made to FIG. 9, which in a graph illustrates alternative upper and lower bounds of the TDC and ADC in a dual TDC-ADC detection system. Graph 90 in FIG. 9 once again plots the number of TOF extractions on the x-axis and the number of detected ions on the y-axis. Curve 92 represents a lower limit of the TDC dynamic range, while curve 94 represents a corresponding upper limit. Similarly curve 96 represents a lower limit of the ADC dynamic range, and curve 98 represents an upper limit of the ADC dynamic range. Thus, the curves shown indicate maximum and minimum number of ions that can be recorded with TDC and ADC for a given number of TOF extractions.

In some cases, it may be desired to record meaningful intensity data with as low as a single time-of-flight extraction. In such cases, the ADC signal gain can be increased, or alternatively the ADC attenuation factor reduced, at the expense of dynamic range. It is possible to select the performance parameters of the dual TDC-ADC detection so that the TDC and AC dynamic ranges overlap for even a single TOF extraction. Performance parameters of the dual TDC-ADC detection system are again listed below:

TDC channels=4
TDC saturation correction, acceptable tolerance=0.03
ADC number of bins=256
ADC uncorrelated noise=1 bin
ADC correlated noise=0.1 bin
Averaged ion response in ADC bins=1.5

It is noted that average ion response in this set of performance parameters is 1.5 bins, as opposed to 0.5 bins, to reflect the increased ADC signal gain. It is further noted that, unlike the case in FIG. 8, in FIG. 9, the curve 96 representing the lower limit of the ADC detection range lies below curve 92 representing the maximum detection capability of the TDC, for all or almost all numbers of TOF extractions. Again, the curves 92 and 98 represent the lower limit of the TDC range and the upper limit of the ADC range, respectively, and together define the dynamic range of the dual TDC-ADC detection system, for these selected performance parameters, as a function of the number of TOF extractions.

Figure 10:
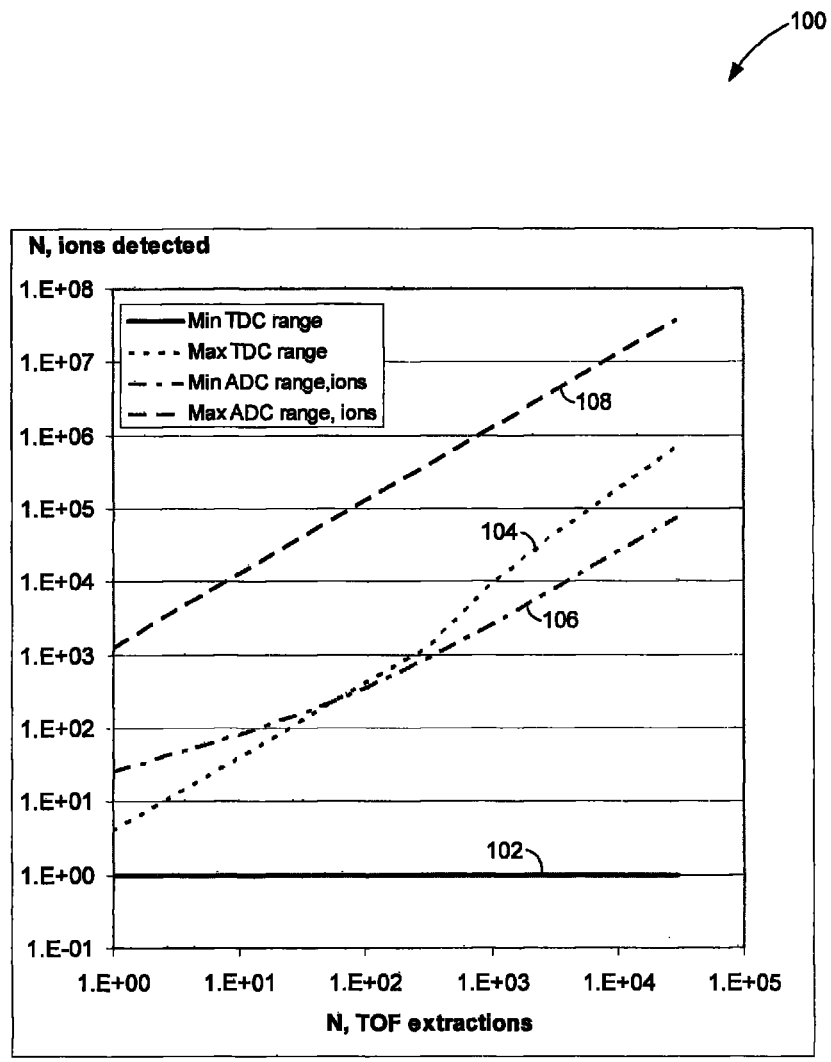
FIG. 10, in a graph, illustrates yet other upper and lower detection limits for both TDC and ADC by plotting a number of ions detected against the number of time of flight extractions.

Reference is now made to FIG. 10, which in a graph illustrates yet other alternative upper and lower bounds of the TDC and ADC in a dual TDC-ADC detection system. Graph 100 in FIG. 10 once again plots the number of TOF extractions on the x-axis and detected the number of ions on the y-axis. Curve 102 represents a lower limit of the TDC dynamic range, while curve 104 represents a corresponding upper limit. Similarly curve 106 represents a lower limit of the ADC dynamic range, and curve 108 represents an upper limit of the ADC dynamic range. Thus, the curves shown indicate maximum and minimum number of ions that can be recorded with TDC and ADC for a given number of TOF extractions.

By reducing the signal gain (or alternatively increasing the attenuation) of the ADC, it is possible to control curve 106 such that TDC/ADC overlap occurs at approximately 100 TOF extractions. Given a 20 KHz extraction rate, composite spectra based on 2000 extractions/spectrum could be generated a rate of 10 spectra/s, which would theoretically have a dynamic range of over 6 orders of magnitude. Exemplary performance parameters to achieve this system characteristic are again listed below:

TDC channels=4
TDC saturation correction, acceptable tolerance=0.03
ADC number of bins=256
ADC uncorrelated noise=1 bin
ADC correlated noise=0.1 bin
Averaged ion response in ADC bins=0.2

As illustrated in FIG. 10, increasing the attenuation of the ADC, reflected in the reduced averaged ion response, can significantly increase dynamic range. However, the increased dynamic range comes at a price, namely that a larger number of TOF extractions are required to ensure overlap. As opposed to other system configurations in which overlap begins at about 10 or fewer TOF extractions, overlap does not begin until about 100 TOF extractions. Consequently, composite spectra cannot necessarily be generated as quickly. It should be appreciated though that dynamic range here is larger than in the lower attenuation cases illustrated in FIGS. 8 and 9 as a tradeoff.

In accordance with aspects of embodiments of the present invention, related methods of operating a time of flight mass spectrometer system, using the herein-described systems, are also provided and within the scope of the present disclosure.

Figure 11:
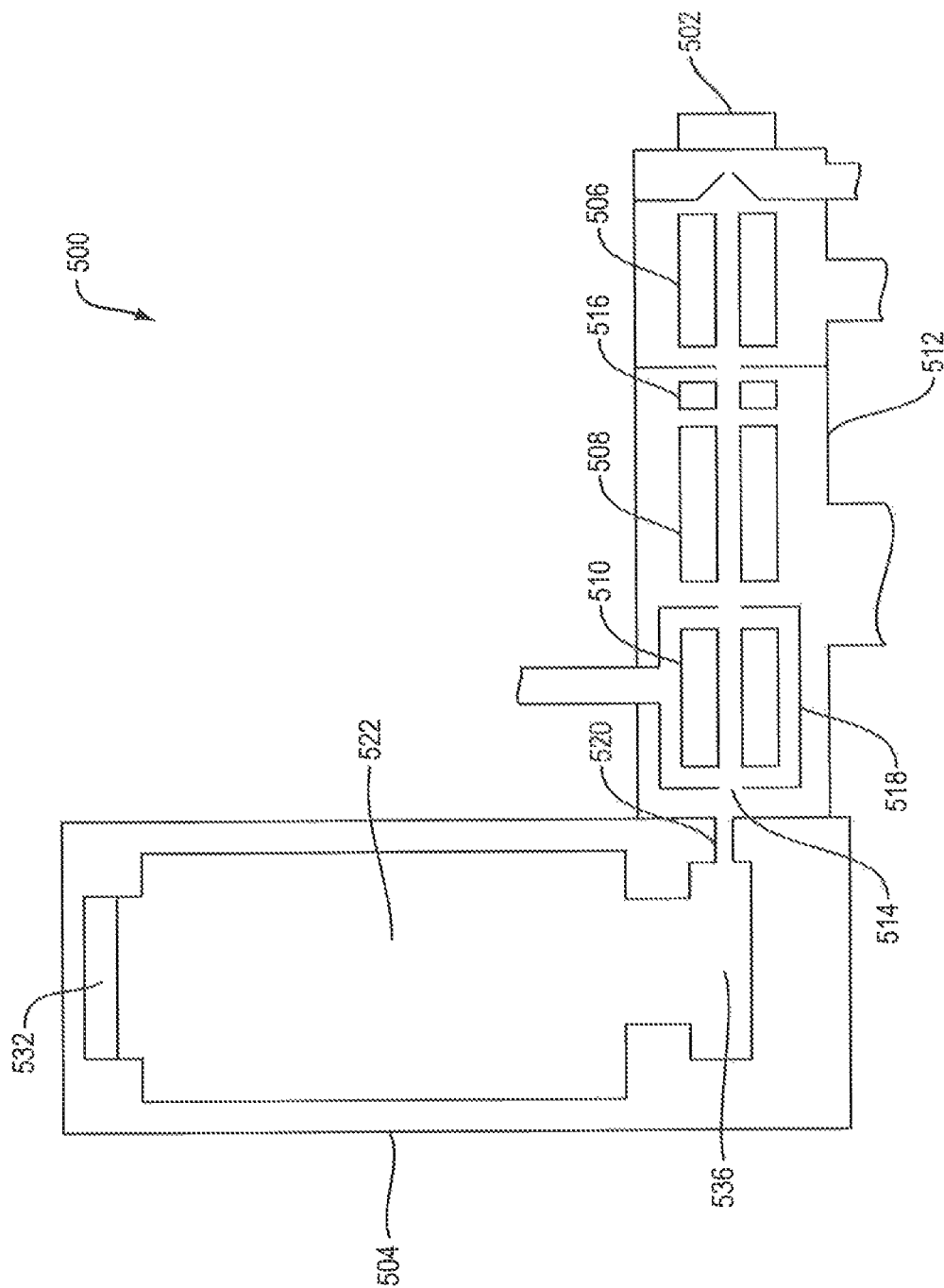
FIG. 11, in a schematic diagram, illustrates a time of flight instrument.

For greater clarity, it should also be appreciated that the herein-described time of flight mass spectrometer system, and related methods of operation, may be practiced with any suitable time of flight instrument. An exemplary time of flight mass spectrometer 500 is illustrated schematically in FIG. 11. It should be understood that mass spectrometer 500 represents only one possible time of flight instrument for use in accordance with embodiments of the present invention. As presented in FIG. 11, TOF mass spectrometer 500 is a hybrid quadrupole/time-of-flight mass spectrometer (QqTOF). However, single-stage time-of-flight mass spectrometers (TOF), dual-stage time-of-flight mass spectrometers (TOF-TOF), hybrid trap/time-of-flight mass spectrometers (Trap-TOF), and mass spectrometers having other time-of-flight topologies may all be used in accordance with embodiments of the present invention as well.

Mass spectrometer 500 comprises ion source 502, time of flight mass analyzer 504 and one or more quadrupoles 506, 508, 510 located upstream of time of flight mass analyzer 504. Ion source 502 may be an electrospray source, but it should be understood that ion source 502 may be any other suitable ion source as well. For example, ion source 502 can be a continuous ion source or a pulsed ion source. Ions emitted from ion source 502 may first pass into collimating quadrupole 506 operated in RF-only mode for providing collisional cooling. Quadrupole 508 disposed in vacuum chamber 512 may be operated in mass resolving mode to select ions having particular mass to charge ratios, and quadrupole 510 may be operated as an ion trap by providing a suitably controlled DC trapping barrier at the exit lens 514. Stubby rods 516 may also be included in the mass spectrometer 500 to facilitate transfer of ions from collimating quadrupole 506 into mass resolving quadrupole 508.

By disposing quadrupole 510 inside a collision chamber 518, trapped ions may be subject to collision-induced dissociation (CID) and/or reaction. Product ions generated in quadrupole 510, as well as remaining precursor ions, may pass into time of flight mass analyzer 504 through ion inlet 520. In the case of a continuous ion source 502, once ions pass through ion inlet 520, they may be collected in a collection region of field generator 536. By application of a short, high voltage electric field, field generator 536 may accelerate ions across field-free drift chamber 522 toward ion detector 532 for detection. Otherwise in the case of a pulsed ion source 502, ions can be introduced to the field generator 536 as batches of ions. According to either approach, ions can be accelerated across the field-free drift chamber 522 as a sequence of time-of-flight extractions. Optionally, one or more ion reflectors (not shown) may also be included to increase the effective length of the drift chamber 522.

It should be understood that mass spectrometer 500 described herein is but one possible time-of-flight instrument that may be used according to aspects of embodiments of the present invention, and that other time-of-flight instrument, such as those noted above, may be suitable as well.

Certain embodiments relate to a time of flight mass spectrometer system comprising: a drift chamber for receiving ions from an ion source, the ions having a plurality of mass to charge ratios; a detector for generating a sequence of detection signals representing ions contacting the detector; a field generator for generating an electric field to push the ions through the drift chamber for detection by the detector; a higher timing resolution digital converter linked to the detector to receive the sequence of detection signals from the detector, the higher timing resolution digital converter being configured to resolve high peak multiplicities, and operable to generate a higher timing resolution data stream by, for each group of ions detected by the detector, i) determining at least one associated detection signal in the sequence of detection signals generated by the detector on detection of the group of ions, and ii) determining corresponding arrival time data for the at least one associated detection signal, the corresponding arrival time data being determined at high resolution time intervals; a lower timing resolution digital converter linked to the detector to receive the sequence of detection signals from the detector, the lower timing resolution digital converter being operable to generate a lower timing resolution data stream by sampling the sequence of detection signals at low resolution time intervals; and a processor linked to the higher timing resolution digital converter and the lower timing resolution digital converter, the processor being operable to: i) process the higher timing resolution data stream to determine a plurality of time and intensity pairs, each time and intensity pair representing a flight time and intensity of ions having a corresponding different mass to charge ratio in the plurality of mass to charge ratios; and ii) process the lower timing resolution data stream to determine a plurality of higher range intensity measurements of the sequence of detection signals.

The processor can be operable to combine the higher timing resolution data stream and the lower timing resolution data stream to obtain a plurality of ion intensities comprising intensity information from both the higher timing resolution data stream and the lower timing resolution data stream. Each ion intensity in the plurality of ion intensities can correspond to a different mass to charge ratio in the plurality of mass to charge ratios. The processor can be operable to obtain the plurality of ion intensities by comparing the intensities in the plurality of time and intensity pairs with the plurality of higher range intensity measurements.

The processor can be operable to, for each time and intensity pair in the plurality of time and intensity pairs, determine the corresponding ion intensity in the plurality of ion intensities, by determining if an intensity condition of the higher timing resolution digital converter is satisfied for that time and intensity pair; and when the intensity condition is satisfied, then determining the corresponding ion intensity for that time and intensity pair from the plurality of higher range intensity measurements; otherwise, selecting the intensity in that time and intensity pair as the corresponding ion intensity.

The processor can be operable to determine if the intensity condition is satisfied for a respective time and intensity pair by determining if a higher range intensity measurement from the plurality of higher range intensity measurements corresponding to the intensity in the respective time and intensity pair exceeds the maximum intensity determinable by the higher timing resolution digital converter.

The lower timing resolution digital converter comprises an analog to digital converter. The lower timing resolution digital converter can further comprise an attenuator for applying an attenuation factor to the sequence of detection signals provided to the lower timing resolution digital converter The lower timing resolution digital converter can determine each higher range intensity measurement in the plurality of higher range intensity measurements using the attenuation factor and an output level of the analog to digital converter.

The processor can be operable to determine the attenuation factor applied by the attenuator, such that at least half of a lower intensity range of the higher resolution data stream is below and outside an upper intensity range of the lower resolution data stream.

The higher timing resolution digital converter can comprise at least one time to digital converter and a discriminator for triggering the at least one time to digital converter, to determine the corresponding arrival time for each detection signal.

The higher timing resolution digital converter can comprise an analog to digital converter operating in a TDC mode, and the processor can comprise a converter processor for identifying the time and intensity pairs.

The detector can be an N-channel detector, the higher timing resolution digital converter and the lower timing resolution channel can each comprise N input channels, and the sequence of detection signals provided by the detector can be an N-channel sequence of detection signals. The higher timing resolution digital converter can comprise N time to digital converters, and a discriminator having at least N input channels for triggering the N time to digital converters to determine the corresponding arrival time for each at least one associated detection signal. The lower timing resolution digital converter can comprise an adder having at least N input channels, and an analog to digital converter linked to the adder. The adder can be an analog adder.

The field generator can be operable, for each time of flight extraction in a plurality of time of flight extractions, to push the ions through the drift chamber as a sequence of groups of ions, wherein each group of ions in the sequence of groups of ions comprises ions of a different mass to the charge ratio in the plurality of mass to charge ratios. The higher timing resolution digital converter can be operable to determine, for each extraction in the plurality of time of flight extractions, an extraction-specific plurality of time and intensity pairs, to provide a plurality of the extraction-specific plurality of time and intensity pairs. The lower timing resolution digital converter can be operable to determine, for each extraction in the plurality of time of flight extractions, an extraction-specific plurality of higher range intensity measurements to provide a plurality of the extraction-specific plurality of higher range intensity measurements. The processor can be operable to combine the plurality of the extraction-specific plurality of time and intensity pairs to provide the plurality of time and intensity pairs, and combine the plurality of the extraction-specific plurality of higher range intensity measurements to provide the plurality of higher range intensity measurements, such that the plurality of time and intensity pairs and the plurality of higher range intensity measurements are each determined over the plurality of time of flight extractions.

The field generator can be operable, for each time of flight extraction in a selected number of time of flight extractions, to push the ions through the drift chamber as a sequence of groups of ions, the selected number being an integer greater than one, wherein each group of ions in the sequence of groups of ions comprises ions of a different mass to the charge ratio in the plurality of mass to charge ratios. The higher timing resolution digital converter can be operable to determine, for each extraction in the selected number of time of flight extractions, an extraction-specific plurality of time and intensity pairs, to provide the selected number of the extraction-specific plurality of time and intensity pairs. The lower timing resolution digital converter can be operable to determine, for each extraction in the selected number of time of flight extractions, an extraction-specific plurality of higher range intensity measurements, to provide the selected number of the extraction-specific plurality of higher range intensity measurements. The processor can be operable to combine the selected number of the extraction-specific plurality of time and intensity pairs to provide the plurality of time and intensity pairs, and combine the selected number of the extraction-specific plurality of higher range intensity measurements to provide the plurality of higher range intensity measurements, such that the plurality of time and intensity pairs and the plurality of higher range intensity measurements are each determined over the selected number of time of flight extractions. The number of time of flight extractions can be selected to adjust an upper limit of the lower intensity range and a lower limit of the upper intensity range, such that the lower intensity range overlaps with the upper intensity range.

Other embodiments relate to a method of operating a time of flight mass spectrometer to process ions having a plurality of mass to charge ratios to determine a plurality of ion intensities. The method comprises: a) introducing the ions into the time of flight mass spectrometer in a plurality of time of flight extractions; b) subjecting the ions to an electric field to, for each extraction in the plurality of time of flight extractions, push the ions through a drift chamber to a detector as a sequence of groups of ions for detection by the detector, wherein each group of ions in the sequence of groups of ions comprises ions having a different mass to charge ratio in the plurality of mass to charge ratios; c) detecting ions contacting the detector to generate a sequence of detection signals; d) determining a higher timing resolution data stream by, providing the sequence of detection signals to a higher timing resolution digital converter configured to resolve high peak multiplicities; and for each group of ions detected by the detector, determining at least one associated detection signal in the sequence of detection signals generated by the detector on detection of that group of ions; e) determining a lower timing resolution data stream by providing the sequence of detection signals to a lower timing resolution digital converter; f) processing the higher timing resolution data stream by, for each mass to charge ratio in the plurality of mass to charge ratios, determining a corresponding time and intensity pair representing a flight time and an intensity of ions having that mass to charge ratio, wherein the intensity in the time and intensity pair is determined from a plurality of lower range intensities measured over a plurality of high resolution time intervals; and g) processing the lower timing resolution data stream to determine a plurality of higher range intensity measurements of the sequence of detection signals. The lower timing resolution digital converter can be operable to measure intensities above a maximum intensity determinable by the higher timing resolution digital converter. The higher timing resolution digital converter can operate at a higher timing resolution that is higher than a lower timing resolution of the lower timing resolution digital converter.

The method can comprise combining the higher timing resolution data stream and the lower timing resolution data stream to provide a combined data set comprising intensity information from both the higher timing resolution data stream and the lower timing resolution data stream. Combining the higher timing resolution data stream and the lower timing resolution data stream to provide the combined data set can comprise comparing the intensities in the plurality of time and intensity pairs with the plurality of higher range intensity measurements.

Combining the higher timing resolution data stream and lower timing resolution data stream can comprise, for each time and intensity pair in the plurality of time and intensity pairs, determining a corresponding ion intensity in the plurality of ion intensities by, determining if an intensity condition of the higher timing resolution digital converter is satisfied for that time and intensity pair; when the intensity condition is satisfied, then determining the corresponding ion intensity for that time and intensity pair from the plurality of higher range intensity measurements; otherwise, selecting the intensity in that time and intensity pair as the corresponding ion intensity. Determining if the intensity condition is satisfied for a respective time and intensity pair can comprise determining if a higher range intensity measurement from the lower timing resolution digital converter corresponding to the intensity in the respective time and intensity pair exceeds the maximum intensity determinable by the higher timing resolution digital converter.

Determining the higher timing resolution data stream can comprise determining, for each extraction in the plurality of time of flight extractions, an extraction-specific plurality of time and intensity pairs, to provide a plurality of the extraction-specific plurality of time and intensity pairs. Determining the plurality of time and intensity pairs can comprise combining the plurality of the extraction-specific plurality of time and intensity pairs to provide the plurality of time and intensity pairs, such that the plurality of time and intensity pairs is determined over the plurality of time of flight extractions. Determining the lower timing resolution data stream can comprise, for each extraction in the plurality of time of flight extractions, an extraction-specific plurality of higher range intensity measurements to provide a plurality of the extraction-specific plurality of higher range intensity measurements. Determining the plurality of higher range intensity measurements can comprise combining the plurality of the extraction-specific plurality of higher range intensity measurements to provide the plurality of higher range intensity measurements, such that the plurality of higher range intensity measurements is determined over the plurality of time of flight extractions.

The plurality of time of flight extractions comprises a selected number of time of flight extractions, the selected number being an integer greater than one. Determining the higher timing resolution data stream can comprise determining, for each extraction in the selected number of time of flight extractions, an extraction-specific plurality of time and intensity pairs to provide the selected number of the extraction-specific plurality of time and intensity pairs. Determining the plurality of time and intensity pairs can comprise combining the selected number of the extraction-specific plurality of time and intensity pairs to provide the plurality of time and intensity pairs, such that the plurality of time and intensity pairs is determined over the selected number of time of flight extractions. Determining the lower timing resolution data stream can comprise determining, for each extraction in the selected number of time of flight extractions, an extraction-specific plurality of higher range intensity measurements to provide the selected number of the extraction-specific plurality of higher range intensity measurements. Determining the plurality of higher range intensity measurements can comprise combining the selected number of the extraction-specific plurality of higher range intensity measurements to provide the plurality of higher range intensity measurements, such that the plurality of higher range intensity measurements is determined over the selected number of time of flight extractions.

The method can further comprise applying an attenuation factor to the sequence of detection signals provided to the lower timing resolution digital converter. Each higher range intensity measurement in the plurality of higher range intensity measurements can be determined based on the attenuation factor and an output level of the analog to digital converter. The attenuation factor can be determined such that at least half of a lower intensity range of the higher resolution data stream is below and outside an upper intensity range of the lower resolution data stream.

The lower timing resolution data stream comprises a plurality of low resolution time intervals representing a duration of the at least one detection signal. Each higher range intensity measurement in the plurality of higher range intensity measurements can represent the intensity of the at least one detection signal during a corresponding low resolution time interval in the plurality of low resolution time intervals.

The method can further comprise, when the intensity condition is satisfied for a time and intensity pair, then identifying a low resolution time interval in the plurality of low resolution time intervals corresponding to the time in that time and intensity pair, and selecting the corresponding low resolution time interval to represent the time in the time and intensity pair.

Certain embodiments relate to a method of operating a time of flight mass spectrometer to process ions having a plurality of mass to charge ratios to determine a plurality of ion intensities. The method can comprise: a) introducing the ions into the time of flight mass spectrometer; b) subjecting the ions to an electric field to push the ions through a drift chamber to a detector as a sequence of groups of ions for detection by the detector, wherein each group of ions in the sequence of groups of ions comprises ions having a different mass to charge ratio in the plurality of mass to charge ratios; c) detecting ions contacting the detector to generate a sequence of detection signals; d) determining a higher timing resolution data stream by providing the sequence of detection signals to a higher timing resolution digital converter configured to resolve high peak multiplicities, and for each group of ions in the sequence of groups of ions, i) determining at least one associated detection signal in the sequence of detection signals generated by the detector on detection of that group of ions, and ii) determining a corresponding time and intensity pair representing a flight time and an intensity of that group of ions, wherein the intensity in the time and intensity pair is determined from a plurality of lower range intensities measured over a plurality of high resolution time intervals; e) determining a lower timing resolution data stream by providing the sequence of detection signals to a lower timing resolution digital converter to determine a plurality of higher range intensity measurements of the sequence of detection signals over a plurality of low resolution time intervals. The lower timing resolution digital converter can be operable to measure intensities above a maximum intensity determinable by the higher timing resolution digital converter. The higher timing resolution digital converter operates at a higher timing resolution that is higher than a lower timing resolution of the lower timing resolution digital converter.

In the above-mentioned embodiments, the lower timing resolution digital converter can be operable to measure intensities above a maximum intensity determinable by the higher timing resolution digital converter. The higher timing resolution digital converter can operate at a higher timing resolution that is higher than a lower timing resolution of the lower timing resolution digital converter. The higher timing resolution of the higher timing resolution digital converter can be at least twice the lower timing resolution of the lower timing resolution digital converter. The higher timing resolution of the higher timing resolution digital converter can be at least five times the lower timing resolution of the lower timing resolution digital converter.

It should be appreciated that section headings used herein are for organizational purposes only and are not to be construed as limiting the subject matter described in any manner. It should further be appreciated that the graphs and drawings referenced herein are for exemplary purposes only and may not necessarily be drawn to scale. It should further be appreciated that other variations and modifications of the invention are possible and within the scope of the present disclosure.

The invention claimed is:

1. A method of operating a time of flight mass spectrometer to process ions having a plurality of mass to charge ratios to determine a plurality of ion intensities, the method comprising:
   a) introducing the ions into the time of flight mass spectrometer in a plurality of time of flight extractions;
   b) subjecting the ions to an electric field to, for each extraction in the plurality of time of flight extractions, push the ions through a drift chamber to a detector as a sequence of groups of ions for detection by the detector, wherein each group of ions in the sequence of groups of ions comprises ions having a different mass to charge ratio in the plurality of mass to charge ratios;
   c) detecting ions contacting the detector to generate a sequence of detection signals;
   d) determining a higher timing resolution data stream by, providing the sequence of detection signals to a higher timing resolution digital converter configured to resolve high peak multiplicities; and for each group of ions detected by the detector, determining at least one associated detection signal in the sequence of detection signals generated by the detector on detection of that group of ions;
   e) determining a lower timing resolution data stream by providing the sequence of detection signals to a lower timing resolution digital converter;
   f) processing the higher timing resolution data stream by, for each mass to charge ratio in the plurality of mass to charge ratios, determining a corresponding time and intensity pair representing a flight time and an intensity of ions having that mass to charge ratio, wherein the intensity in the time and intensity pair is determined from a plurality of lower range intensities measured over a plurality of high resolution time intervals; and
   g) processing the lower timing resolution data stream to determine a plurality of higher range intensity measurements of the sequence of detection signals; wherein the lower timing resolution digital converter is operable to measure intensities above a maximum intensity determinable by the higher timing resolution digital converter; and wherein the higher timing resolution digital converter operates at a higher timing resolution that is higher than a lower timing resolution of the lower timing resolution digital converter.

2. The method as defined in claim 1, further comprising combining the higher timing resolution data stream and the lower timing resolution data stream to provide a combined data set comprising intensity information from both the higher timing resolution data stream and the lower timing resolution data stream.

3. The method as defined in claim 2, wherein combining the higher timing resolution data stream and the lower timing resolution data stream comprises, for each time and intensity pair in the plurality of time and intensity pairs, determining a corresponding ion intensity in the plurality of ion intensities by,
- determining if an intensity condition of the higher timing resolution digital converter is satisfied for that time and intensity pair;
- when the intensity condition is satisfied, then determining the corresponding ion intensity for that time and intensity pair from the plurality of higher range intensity measurements; otherwise, selecting the intensity in that time and intensity pair as the corresponding ion intensity;
- wherein when the intensity condition is satisfied for a time and intensity pair, then the corresponding ion intensity in the plurality of ion intensities exceeds the maximum intensity determinable by the higher timing resolution digital converter.

4. The method as defined in claim 2, wherein the higher timing resolution of the higher timing resolution digital converter is at least twice the lower timing resolution of the lower timing resolution digital converter.

5. The method as defined in claim 2, wherein the higher timing resolution of the higher timing resolution digital converter is at least five times the lower timing resolution of the lower timing resolution digital converter.

6. The method as defined in claim 2, wherein the higher timing resolution digital converter comprises at least one time to digital converter and a discriminator for triggering the at least one time to digital converter to determine the time in each time and intensity pair in the plurality of time and intensity pairs;
and the lower timing resolution digital converter comprises an analog to digital converter.

7. The method as defined in claim 3, wherein determining if the intensity condition is satisfied for a respective time and intensity pair comprises determining if a higher range intensity measurement from the lower timing resolution digital converter corresponding to the intensity in the respective time and intensity pair exceeds the maximum intensity determinable by the higher timing resolution digital converter.

8. The method as defined in claim 6, wherein
step d) comprises determining, for each extraction in the plurality of time of flight extractions, an extraction-specific plurality of time and intensity pairs, to provide a plurality of the extraction-specific plurality of time and intensity pairs, and step f) comprises combining the plurality of the extraction-specific plurality of time and intensity pairs to provide the plurality of time and intensity pairs, such that the plurality of time and intensity pairs is determined over the plurality of time of flight extractions; and
step e) comprises determining, for each extraction in the plurality of time of flight extractions, an extraction-specific plurality of higher range intensity measurements to provide a plurality of the extraction-specific plurality of higher range intensity measurements, and step g) comprises combining the plurality of the extraction-specific plurality of higher range intensity measurements to provide the plurality of higher range intensity measurements, such that the plurality of higher range intensity measurements is determined over the plurality of time of flight extractions.

9. The method as defined in claim 2, wherein a lower intensity range of the higher timing resolution data stream overlaps an upper intensity range of the lower timing resolution data stream.

10. The method as defined in claim 9, wherein the plurality of time of flight extractions comprises a selected number of time of flight extractions, the selected number being an integer greater than one;
step d) comprises determining, for each extraction in the selected number of time of flight extractions, an extraction-specific plurality of time and intensity pairs to provide the selected number of the extraction-specific plurality of time and intensity pairs, and step f) comprises combining the selected number of the extraction-specific plurality of time and intensity pairs to provide the plurality of time and intensity pairs, such that the plurality of time and intensity pairs is determined over the selected number of time of flight extractions;
step e) comprises determining, for each extraction in the selected number of time of flight extractions, an extraction-specific plurality of higher range intensity measurements to provide the selected number of the extraction-specific plurality of higher range intensity measurements, and step g) comprises combining the selected number of the extraction-specific plurality of higher range intensity measurements to provide the plurality of higher range intensity measurements, such that the plurality of higher range intensity measurements is determined over the selected number of time of flight extractions; and
wherein the number of time of flight extractions is selected to adjust an upper limit of the lower intensity range and a lower limit of the upper intensity range, such that the lower intensity range overlaps with the upper intensity range.

11. The method as defined in claim 6, further comprising applying an attenuation factor to the sequence of detection signals provided to the lower timing resolution digital converter; wherein each higher range intensity measurement in the plurality of higher range intensity measurements is determined based on the attenuation factor and an output level of the analog to digital converter.

12. The method as defined in claim 11, further comprising determining the attenuation factor such that at least half of a lower intensity range of the higher resolution data stream is below and outside an upper intensity range of the lower resolution data stream.

13. The method as defined in claim 2, wherein the higher timing resolution digital converter comprises an analog to digital converter operating in a TDC mode and a converter processor for identifying the time and intensity pairs.

14. The method as defined in claim 2, wherein combining the higher timing resolution data stream and the lower timing resolution data stream to provide the combined data set comprises comparing the intensities in the plurality of time and intensity pairs with the plurality of higher range intensity measurements.

15. The method as defined in claim 3, wherein the lower timing resolution data stream comprises a plurality of low resolution time intervals representing a duration of the at least one detection signal, and,
  each higher range intensity measurement in the plurality of higher range intensity measurements represents the intensity of the at least one detection signal during a corresponding low resolution time interval in the plurality of low resolution time intervals.

16. The method as defined in claim 15, further comprising, when the intensity condition is satisfied for a time and intensity pair, then identifying a low resolution time interval in the plurality of low resolution time intervals corresponding to the time in that time and intensity pair, and selecting the corresponding low resolution time interval to represent the time in the time and intensity pair.

17. The method as defined in claim 2, wherein the detector is an N-channel detector, the higher timing resolution digital converter and the lower timing resolution digital converter each comprise N input channels, and the sequence of detection signals is an N-channel sequence of detection signals.

18. A method of operating a time of flight mass spectrometer to process ions having a plurality of mass to charge ratios to determine a plurality of ion intensities, the method comprising:
  a) introducing the ions into the time of flight mass spectrometer;
  b) subjecting the ions to an electric field to push the ions through a drift chamber to a detector as a sequence of groups of ions for detection by the detector, wherein each group of ions in the sequence of groups of ions comprises ions having a different mass to charge ratio in the plurality of mass to charge ratios;
  c) detecting ions contacting the detector to generate a sequence of detection signals;
  d) determining a higher timing resolution data stream by providing the sequence of detection signals to a higher timing resolution digital converter configured to resolve high peak multiplicities, and for each group of ions in the sequence of groups of ions,
    i) determining at least one associated detection signal in the sequence of detection signals generated by the detector on detection of that group of ions, and
    ii) determining a corresponding time and intensity pair representing a flight time and an intensity of that group of ions, wherein the intensity in the time and intensity pair is determined from a plurality of lower range intensities measured over a plurality of high resolution time intervals; and
  e) determining a lower timing resolution data stream by providing the sequence of detection signals to a lower timing resolution digital converter to determine a plurality of higher range intensity measurements of the sequence of detection signals over a plurality of low resolution time intervals;
  wherein the lower timing resolution digital converter is operable to measure intensities above a maximum intensity determinable by the higher timing resolution digital converter; and wherein the higher timing resolution digital converter operates at a higher timing resolution that is higher than a lower timing resolution of the lower timing resolution digital converter.

19. A time of flight mass spectrometer system comprising a drift chamber for receiving ions from an ion source, the ions having a plurality of mass to charge ratios;
  a detector for generating a sequence of detection signals representing ions contacting the detector;
  a field generator for generating an electric field to push the ions through the drift chamber for detection by the detector; a higher timing resolution digital converter linked to the detector to receive the sequence of detection signals from the detector, the higher timing resolution digital converter being configured to resolve high peak multiplicities, and operable to generate a higher timing resolution data stream by, for each group of ions detected by the detector, i) determining at least one associated detection signal in the sequence of detection signals generated by the detector on detection of the group of ions, and ii) determining corresponding arrival time data for the at least one associated detection signal, the corresponding arrival time data being determined at high resolution time intervals;
  a lower timing resolution digital converter linked to the detector to receive the sequence of detection signals from the detector, the lower timing resolution digital converter being operable to generate a lower timing resolution data stream by sampling the sequence of detection signals at low resolution time intervals; and a processor linked to the higher timing resolution digital converter and the lower timing resolution digital converter, the processor being operable to:
    i) process the higher timing resolution data stream to determine a plurality of time and intensity pairs, each time and intensity pair representing a flight time and intensity of ions having a corresponding different mass to charge ratio in the plurality of mass to charge ratios; and
    ii) process the lower timing resolution data stream to determine a plurality of higher range intensity measurements of the sequence of detection signals;
  wherein the lower timing resolution digital converter is operable to measure intensities above a maximum intensity determinable by the higher timing resolution digital converter; and wherein the higher timing resolution digital converter operates at a higher timing resolution that is higher than a lower timing resolution of the lower timing resolution digital converter.

20. The time of flight mass spectrometer system as defined in claim 19, wherein the processor is operable to combine the higher timing resolution data stream and the lower timing resolution data stream to obtain a plurality of ion intensities comprising intensity information from both the higher timing resolution data stream and the lower timing resolution data stream, wherein each ion intensity in the plurality of ion intensities corresponds to a different mass to charge ratio in the plurality of mass to charge ratios.

21. The time of flight mass spectrometer system as defined in claim 20, wherein the processor is operable to, for each time and intensity pair in the plurality of time and intensity pairs, determine the corresponding ion intensity in the plurality of ion intensities, by determining if an intensity condition of the higher timing resolution digital converter is satisfied for that time and intensity pair; and
  when the intensity condition is satisfied, then determining the corresponding ion intensity for that time and intensity pair from the plurality of higher range intensity measurements; otherwise, selecting the intensity in that time and intensity pair as the corresponding ion intensity;
  wherein when the intensity condition is satisfied for a time and intensity pair, then the corresponding ion intensity in the plurality of ion intensities exceeds the maximum intensity determinable by the higher timing resolution digital converter.

22. The time of flight mass spectrometer system as defined in claim 21, wherein the processor is operable to determine if the intensity condition is satisfied for a respective time and intensity pair by determining if a higher range intensity measurement from the plurality of higher range intensity measurements corresponding to the intensity in the respective time and intensity pair exceeds the maximum intensity determinable by the higher timing resolution digital converter.

23. The time of flight mass spectrometer system as defined in claim 20, wherein the higher timing resolution of the higher timing resolution digital converter is at least twice the lower timing resolution of the lower timing resolution digital converter.

24. The time of flight mass spectrometer system as defined in claim 20, wherein the higher timing resolution of the higher timing resolution digital converter is at least five times the lower timing resolution of the lower timing resolution digital converter.

25. The time of flight mass spectrometer system as defined in claim 20, wherein the lower timing resolution digital converter comprises an analog to digital converter.

26. The time of flight mass spectrometer system as defined in claim 25, wherein the lower timing resolution digital converter further comprises an attenuator for applying an attenuation factor to the sequence of detection signals provided to the lower timing resolution digital converter; and the lower timing resolution digital converter determines each higher range intensity measurement in the plurality of higher range intensity measurements using the attenuation factor and an output level of the analog to digital converter.

27. The time of flight mass spectrometer system as defined in claim 26, wherein the processor is operable to determine the attenuation factor applied by the attenuator, such that at least half of a lower intensity range of the higher resolution data stream is below and outside an upper intensity range of the lower resolution data stream.

28. The time of flight mass spectrometer system as defined in claim 25, wherein the higher timing resolution digital converter comprises at least one time to digital converter and a discriminator for triggering the at least one time to digital converter, to determine the corresponding arrival time for each detection signal.

29. The time of flight mass spectrometer system as defined in claim 25, wherein the higher timing resolution digital converter comprises an analog to digital converter operating in a TDC mode, and the processor comprises a converter processor for identifying the time and intensity pairs.

30. The time of flight mass spectrometer system as defined in claim 20, wherein the detector is an N-channel detector, the higher timing resolution digital converter and the lower timing resolution channel each comprise N input channels, and the sequence of detection signals provided by the detector is an N-channel sequence of detection signals.

31. The time of flight mass spectrometer system as defined in claim 30, wherein the higher timing resolution digital converter comprises N time to digital converters, and a discriminator having at least N input channels for triggering the N time to digital converters to determine the corresponding arrival time for each at least one associated detection signal; and the lower timing resolution digital converter comprises an adder having at least N input channels, and an analog to digital converter linked to the adder.

32. The time of flight mass spectrometer system as defined in claim 20, wherein the processor is operable to obtain the plurality of ion intensities by comparing the intensities in the plurality of time and intensity pairs with the plurality of higher range intensity measurements.

33. The time of flight mass spectrometer system as defined in claim 20, wherein the field generator is operable, for each time of flight extraction in a plurality of time of flight extractions, to push the ions through the drift chamber as a sequence of groups of ions, wherein each group of ions in the sequence of groups of ions comprises ions of a different mass to the charge ratio in the plurality of mass to charge ratios;
   the higher timing resolution digital converter is operable to determine, for each extraction in the plurality of time of flight extractions, an extraction-specific plurality of time and intensity pairs, to provide a plurality of the extraction-specific plurality of time and intensity pairs;
   the lower timing resolution digital converter is operable to determine, for each extraction in the plurality of time of flight extractions, an extraction-specific plurality of higher range intensity measurements to provide a plurality of the extraction-specific plurality of higher range intensity measurements; and
   the processor is operable to i) combine the plurality of the extraction-specific plurality of time and intensity pairs to provide the plurality of time and intensity pairs, and ii) combine the plurality of the extraction-specific plurality of higher range intensity measurements to provide the plurality of higher range intensity measurements, such that the plurality of time and intensity pairs and the plurality of higher range intensity measurements are each determined over the plurality of time of flight extractions.

34. The time of flight mass spectrometer system as defined in claim 20, wherein a lower intensity range of the higher timing resolution data stream overlaps an upper intensity range of the lower timing resolution data stream.

35. The time of flight mass spectrometer system as defined in claim 34, wherein the field generator is operable, for each time of flight extraction in a selected number of time of flight extractions, to push the ions through the drift chamber as a sequence of groups of ions, the selected number being an integer greater than one, wherein each group of ions in the sequence of groups of ions comprises ions of a different mass to the charge ratio in the plurality of mass to charge ratios;
   the higher timing resolution digital converter is operable to determine, for each extraction in the selected number of time of flight extractions, an extraction-specific plurality of time and intensity pairs, to provide the selected number of the extraction-specific plurality of time and intensity pairs;
   the lower timing resolution digital converter is operable to determine, for each extraction in the selected number of time of flight extractions, an extraction-specific plurality of higher range intensity measurements, to provide the selected number of the extraction-specific plurality of higher range intensity measurements; and
   the processor is operable to i) combine the selected number of the extraction-specific plurality of time and intensity pairs to provide the plurality of time and intensity pairs, and ii) combine the selected number of the extraction-specific plurality of higher range intensity measurements to provide the plurality of higher range intensity measurements, such that the plurality of time and intensity pairs and the plurality of higher range intensity measurements are each determined over the selected number of time of flight extractions;
   wherein the number of time of flight extractions is selected to adjust an upper limit of the lower intensity range and a lower limit of the upper intensity range, such that the lower intensity range overlaps with the upper intensity range.

36. The time of flight mass spectrometer system as defined in claim 19, wherein transmission of the lower timing resolution data stream is controllable based upon the content of the higher timing resolution data stream.

* * * * *